United States Patent
Chhabra et al.

(10) Patent No.: US 10,755,156 B2
(45) Date of Patent: Aug. 25, 2020

(54) CONFIGURABLE INTEGRITY PROTECTED LINK FOR SECURE ACCELERATOR COMMUNICATION

(71) Applicant: Intel Corporation, Santa Clara, CA (US)

(72) Inventors: Siddhartha Chhabra, Portland, OR (US); Reouven Elbaz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/366,883

(22) Filed: Mar. 27, 2019

(65) Prior Publication Data

US 2019/0220721 A1    Jul. 18, 2019

Related U.S. Application Data

(60) Provisional application No. 62/779,826, filed on Dec. 14, 2018.

(51) Int. Cl.
*G06K 19/07* (2006.01)
*G06F 21/72* (2013.01)
(Continued)

(52) U.S. Cl.
CPC ......... *G06K 19/0724* (2013.01); *G06F 21/72* (2013.01); *G06F 21/85* (2013.01);
(Continued)

(58) Field of Classification Search
CPC .. G06F 21/72; G06F 2221/2123; G06F 21/85; G06F 13/102; G06F 13/4282;
(Continued)

(56) References Cited

U.S. PATENT DOCUMENTS

2011/0296440 A1* 12/2011 Laurich ................. G06F 21/602
                                                                 719/326
2017/0293765 A1* 10/2017 Kang .................. G06F 9/30101
(Continued)

OTHER PUBLICATIONS

"Announcing the Advanced Encryption Standard (AES)", Federal Information Processing Standards Publication 197, Nov. 26, 2001, 51 pages.

(Continued)

*Primary Examiner* — Yong Hang Jiang
(74) *Attorney, Agent, or Firm* — Alliance IP, LLC

(57) ABSTRACT

Systems, methods, and apparatuses associated with data exchanged between a processor and a hardware accelerator are disclosed. In various embodiments, a method comprises receiving, at a first endpoint, a first request to change a current tag frequency used to generate a first authentication tag for one or more transactions of a first transaction window sent over a data link to a second endpoint coupled to a processor core. The method further includes sending a message to the second endpoint that the current tag frequency is to change to a new tag frequency, where a second authentication tag for one or more transactions in a second transaction window is to be generated based on the new tag frequency. The method also includes changing the current tag frequency to the new tag frequency based, at least in part, on receiving an acknowledgement that the second endpoint received the message.

20 Claims, 16 Drawing Sheets

(51) Int. Cl.
*G06K 7/10* (2006.01)
*H04L 12/761* (2013.01)
*G06F 21/85* (2013.01)

(52) U.S. Cl.
CPC .......... *G06K 7/10257* (2013.01); *H04L 45/16* (2013.01); *G06F 2221/2123* (2013.01)

(58) Field of Classification Search
CPC ...... G06F 21/44; G06F 21/572; G06F 21/602; G06F 21/73; G06F 21/75; G06F 21/76; G06F 21/78; G06F 2213/0026; G06F 2213/0042; G06F 2221/2103; G06F 2221/2135; G06F 3/061; G06F 3/0619; G06F 3/0646; G06F 3/0659; G06F 3/067; G06K 19/0724; G06K 7/10257; H04L 45/16; H04L 63/08; H04L 2209/38; H04L 41/0806; H04L 41/0856; H04L 41/0869; H04L 41/0883; H04L 41/0889; H04L 41/22; H04L 63/0428; H04L 63/0823; H04L 63/0876; H04L 63/20; H04L 67/06; H04L 67/1097; H04L 69/12; H04L 69/14; H04L 9/088; H04L 9/3234; H04L 9/3239; H04L 9/3265; H04L 9/3271; G11C 16/00; G11C 16/10; G11C 16/14; G11C 16/26; Y04S 40/162

See application file for complete search history.

(56) References Cited

U.S. PATENT DOCUMENTS

2018/0181774 A1\* 6/2018 Boivie .................. G06F 21/75
2019/0052617 A1\* 2/2019 Chen .................... G06F 21/73

OTHER PUBLICATIONS

Dworkin, Morris, "Recommendation for Block Cipher Modes of Operation: Galois/Counter Mode (GCM) and GMAC", National Institute of Standards and Technology, U.S. Department of Commerce, NIST Special Publication 800-38D, Nov. 2007, accessed at: https://nvlpubs.nist.gov/nistpubs/Legacy/SP/nistspecialpublication800-38d.pdf on Mar. 1, 2019, 39 pages.

\* cited by examiner

CONFIGURABLE INTEGRITY PROTECTED LINK FOR SECURE ACCELERATOR COMMUNICATION

CROSS-REFERENCE TO RELATED APPLICATION

This application is a nonprovisional patent application and claims the benefit of priority under 35 U.S.C. § 119(e) to U.S. Provisional Patent Application Ser. No. 62/779,826, filed on Dec. 14, 2018, and entitled CONFIGURABLE INTEGRITY PROTECTED LINK FOR SECURE ACCELERATOR COMMUNICATION, the disclosure of which is hereby incorporated by reference in its entirety.

TECHNICAL FIELD

Various embodiments generally may relate to the technical field of computing, and in particular, to a configurable integrity protected link for secure accelerator communication.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The use of specialized hardware for performance and energy efficient computing is taking center stage for usages such as graphics processing, artificial intelligence, and machine learning, resulting in an explosion of accelerator usage. Existing trusted execution environment (TEE) protections, however, do not extend to accelerators and require complementary mechanisms to be developed. Accelerators are commonly attached either through peripheral component interconnect express (PCIe) or other specialized high speed interfaces. In order to secure communication with accelerators via a link, it is required that the secrets flowing over the link are confidentiality and integrity protected. Integrity and confidentiality protection can impact bandwidth, which can decrease the benefits of an accelerator that requires high bandwidth.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
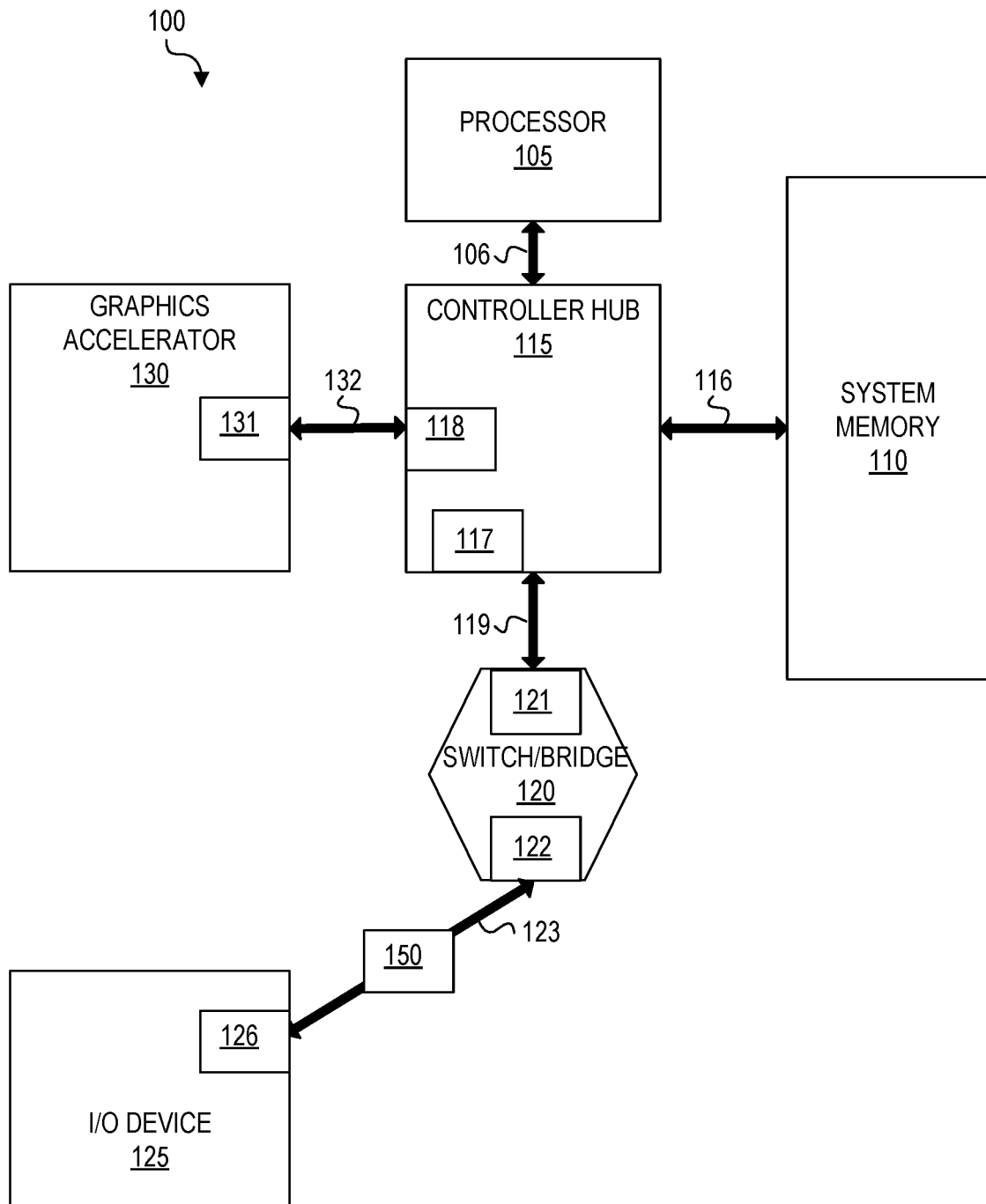
FIG. 1 illustrates an embodiment of a computing system including an interconnect architecture.

The present disclosure provides various possible embodiments, or examples, of systems, methods, apparatuses, and architectures for implementing a tag frequency change protocol in a system with link encryption. In one or more embodiments, a pair of configurable cryptographic engines associated with a link facilitates the tag frequency change protocol for that link. In an example, a tag frequency change protocol in a link encryption architecture allows for a message authentication code (MAC) frequency to be configurable at run time. The MAC (or tag) generation frequency can either be increased or decreased under the control of trusted platform software at run time without impacting security. When high-value secrets or other high-value information is flowing on the link, the MAC or tag generation frequency can be kept high (e.g., one per transaction) to allow for maximum security. This, for example, might be the case at boot-up. Similarly, the tag frequency change protocol allows for the tag generation frequency to be lowered to one tag per N transactions. This mode reduces the bandwidth requirements, allowing for a full bandwidth link protection solution and at the same time does not compromise security as an attack on integrity will eventually get detected. For many original equipment manufacturer (OEM) systems, this is required for efficient use of link protection.

The link encryption architecture with a tag frequency change protocol and related features will be further described below. The disclosure also outlines the design of a cryptographic pipeline that implements the tag frequency change protocol.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. For example, specific details may include specific types of processors and system configurations, specific hardware structures, specific architectural and micro architectural details, specific register configurations, specific instruction types, specific system components, specific measurements/heights, specific processor pipeline stages and operation etc. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The phrase "in various embodiments," "in some embodiments," and the like may be used herein. The phrase generally does not refer to the same embodiments; however, it may. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (at least one A), (at least one B), or (at least one A and at least one B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous, unless the context dictates otherwise.

Embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed but may also have additional steps not included in the figure(s). A process may correspond to a method, a function, a procedure, a subroutine, a subprogram, and the like. When a process corresponds to a function, its termination may correspond to a return of the function to the calling function and/or the main function. Additionally, some or all of the operations in two or more separate flowcharts may be combined into one embodiment.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

A computing system or a platform may use various devices coupled to a computer bus extensively. A computer bus may include related hardware components (wire, optical fiber, etc.) and software, including communication protocols. A peripheral component interconnect (PCI) bus or a PCI Express (PCIe, PCI-E) may be a computer bus based on a specification or interface standard that provides a mechanism for system software, or a system driver, to perform various operations related to the configuration of a device coupled to the PCI bus or the PCIe bus. Devices, or components coupled to a computer bus may also be referred to as functions. PCIe may operate in consumer, server, and industrial applications, as a motherboard-level interconnect (to link motherboard-mounted peripherals), a passive backplane interconnect, and as an expansion card interface for add-in boards. PCIe devices communicate via a logical connection called an interconnect or link. A link is a point-to-point communication channel between two PCIe ports allowing both of them to send and receive ordinary PCI requests, e.g., configuration, input/output (I/O), or memory read/write, and interrupts. At the physical level, a link may be composed of one or more lanes. Low-speed peripherals, such as an 802.11 Wi-Fi card, use a single-lane (x1) link, while a graphics adapter typically uses a much wider and faster 16-lane link. It should be noted that a "link" can also refer to communication channels associated with any other type of interface standards connecting high-speed components.

Although the following embodiments may be described with reference to a tag frequency change protocol in integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from a tag frequency change protocol. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point links that interconnect a set of components is illustrated. A system 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller hub 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
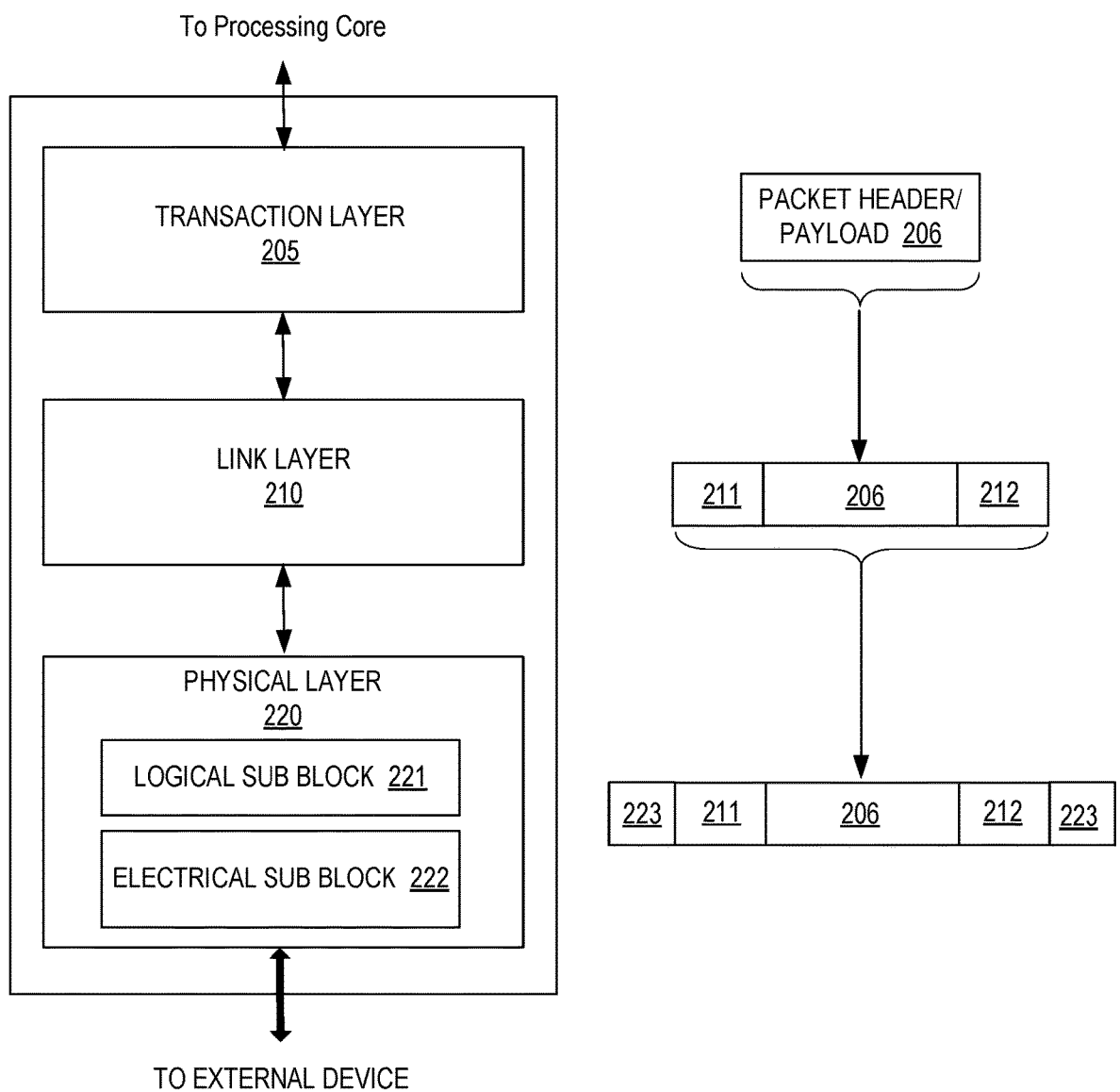
FIG. 2 illustrates an embodiment of an interconnect architecture including a layered stack.
Figure 3:
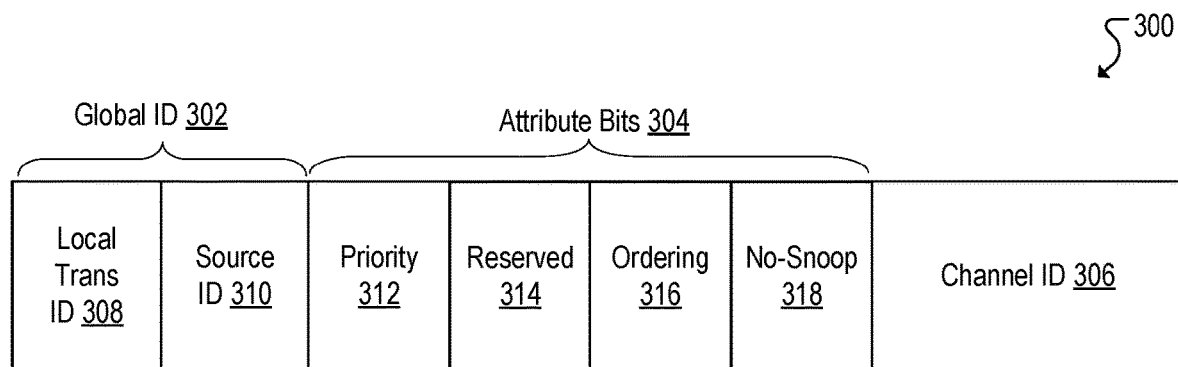
FIG. 3 illustrates an embodiment of a request or packet to be generated or received within an interconnect architecture.
Figure 4:
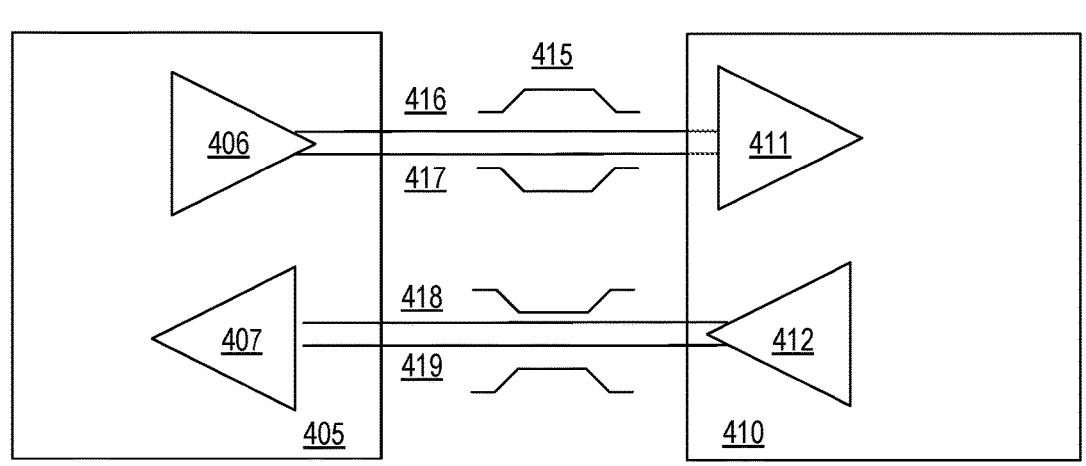
FIG. 4 illustrates an embodiment of a transmitter and receiver pair for an interconnect architecture.

Turning to FIG. 2 an embodiment of a layered protocol stack is illustrated, which may be implemented in one or more components of a mobile computing device, such as an application processor or baseband processor or modem, among other examples. Layered protocol stack 200 includes logic implemented in hardware circuitry and/or software to implement any form of a layered communication stack, such as a Quick Path Interconnect (QPI) stack, a PCIe stack, a next generation high performance computing interconnect stack, or other layered stack. Although the discussion immediately below in reference to FIGS. 3-4 are in relation to a PCIe stack, similar concepts may be applied to other interconnect stacks, such as OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centrig™ interconnect, among others. In one embodiment, protocol stack 200 is a PCIe protocol stack including transaction layer 205, link layer 210 (also referred to herein as 'data link layer'), and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the transaction layer 205 and data link layer 210 to carry the information from the transmitting component to the receiving component. As the transmitted packets flow through the other layers, they are extended with additional information necessary to handle packets at those layers. At the receiving side the reverse process occurs and packets get transformed from their physical layer 220 representation to the data link layer 210 representation and finally (for transaction layer packets) to the form that can be processed by the transaction layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The transaction layer 205 typically manages credit-based flow control for TLPs. PCIe implements split transactions, i.e. transactions with request and response separated by time, allowing a link to carry other traffic while the target device gathers data for the response.

In addition, PCIe utilizes credit-based flow control. In this scheme, a device advertises an initial amount of credit for each of the receive buffers in transaction layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a memory address space, a configuration address space, a message address space, and an input/output address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global identifier field 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

With reference again to FIG. 2, link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components of a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub-block 221 and electrical sub-block 222 to physically transmit a packet to an external device. Here, logical sub-block 221 is responsible for the "digital" functions of physical layer 220. In this regard, the logical sub-block includes a transmit section to prepare outgoing information for transmission by electrical sub-block 222, and a receiver section to identify and prepare received information before passing it to the link layer 210.

Physical layer 220 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an $8b/10b$ transmission code is employed, where ten-bit symbols are transmitted/received. In other embodiments $128b/130b$ transmission coding is used, among other examples. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

For purposes of illustrating certain example techniques for using a tag frequency change protocol in accordance with embodiments disclosed herein, it is important to understand the activities that may be occurring in systems in which link encryption is used with accelerators. Accordingly, the following foundational information may be viewed as a basis from which the present disclosure may be properly explained.

Generally, an accelerator is a microchip designed to enable faster processing of specialized hardware such as hardware designed for graphics processing, artificial intelligence, and machine learning, for example. Interconnects, such as PCIe or other high speed interfaces are typically used to attach accelerators to processors. Typically, makers of specialized hardware and processors to which they connect require confidentiality and integrity to be maintained for at least some of the information that flows over the links between accelerators and processors. For example, at boot time for a system, secrets or other important information is typically exchanged over links of the system to initialize the various components of the system. Integrity of data is protected by preventing modification of the data, and confidentiality is protected by preventing the data from being exposed. Integrity protecting a link typically is done by associating a message authentication code (MAC), which is generated at the transmitter and verified at the receiver. The MAC typically includes a nonce as well to provide replay protection.

Authenticated encryption (e.g., Advanced Encryption Standard with Galois Counter Mode (AES-GCM)) is one mode for link encryption that provides confidentiality and integrity at near zero latency costs. While the latency addition is minimal, the MAC required for integrity forms a separate transaction and can have a significant bandwidth impact (doubling the required bandwidth in the worst case). Many of the emerging accelerators (e.g., machine learning, graphics) require high bandwidth and low latency links and hence the current solutions offset the benefits of acceleration significantly.

Previous solutions have proposed sending a tag for each request/response/completion that is sent over the link. Since the tag is sent as a separate transaction, the bandwidth overheads of these previous solutions are very high, doubling the required bandwidth in some cases. For some transactions where the tag can be sent over the same transaction, the overheads may not always reach a bandwidth that is double the bandwidth of a system with no link protection but may still consume significant additional bandwidth. Consequently, solutions for high speed accelerators requiring high-bandwidth, are critical to allow the use of accelerators securely and efficiently.

Figure 5:
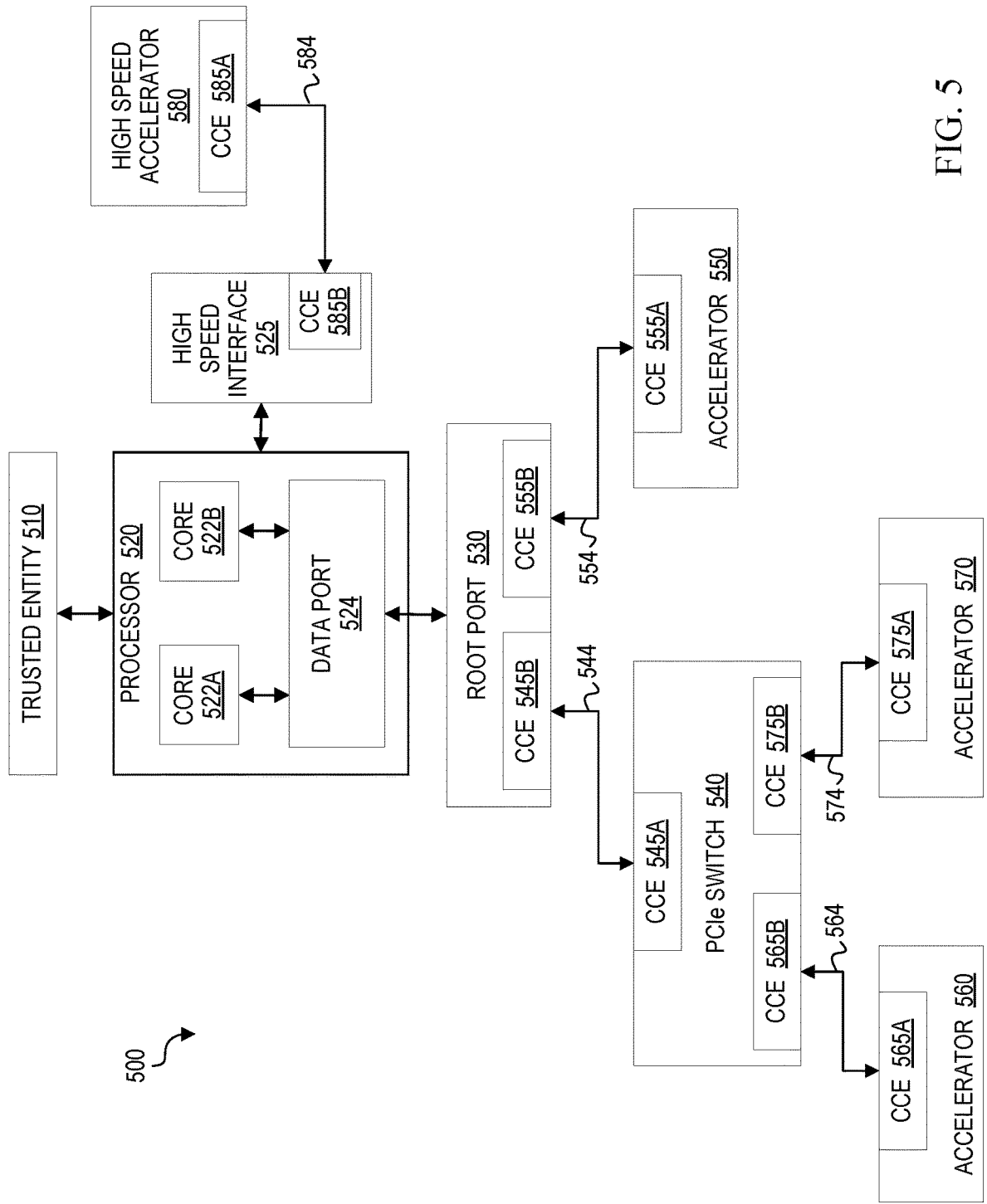
FIG. 5 illustrates an architecture for a system with link encryption provisioned with configurable cryptographic engines to facilitate a tag frequency change protocol, according to various embodiments.

An architecture 500 for a system with link encryption provisioned with configurable cryptographic engines as shown in FIG. 5 resolves many of the aforementioned issues (and more). Configurable cryptographic engines (CCEs) in architecture 500 facilitate a tag frequency change protocol that allows run time configuration of the frequency of generating authentication tags for data being transmitted on one or more links from an accelerator to a processor and vice versa. This frequency is also referred to herein as 'tag generation frequency' and 'tag frequency'. In the architecture, each link to be protected includes a pair of CCEs, with one CCE at the sending/transmitting side of the link and the other CCE at the receiving side of the link. Each CCE may operate as a transmitter to and receiver from its corresponding CCE in the pair. A request to change the frequency of generating authentication tags for data being transmitted across links in the architecture can be initiated by a trusted entity and propagated to the relevant endpoints provisioned with a CCE. For example, a frequency change request may be propagated to the CCEs along the path from a particular accelerator to the root port so that all links along the path have the same security properties. An originating (or sending) endpoint that is sending data across a link to another endpoint can send a special message to a receiving endpoint that receives data sent across the link. The message can indicate that a change in tag generation frequency has been requested. The receiving endpoint can acknowledge the change with an acknowledgement message. Further communications can include a transaction that indicates it contains the last authentication tag to be transmitted at the old tag frequency, and subsequent transactions can then be transmitted based on the new tag frequency.

The disclosed technology enables secure use of accelerators efficiently by allowing flexibility in the bandwidth overheads for security. Embodiments described herein allow for tag frequency in a system to be kept high in periods during which high-value information is being exchanged (e.g., boot time) to provide maximum security. For example, a tag can be applied to each transaction in one example. Embodiments described herein also allow tag frequency in a system to be lowered during other periods, when maximum security is not required. In this scenario, the bandwidth requirements of the system are reduced to enable faster processing without significantly compromising security. An attack on integrity when tag frequency is lowered is still detectable, although detection occurs over a transaction window having multiple transactions rather than a transaction window having an individual transaction.

With reference to FIG. 5, architecture 500 shows an example system with link encryption provisioned with configurable cryptographic engines to facilitate a tag frequency change protocol. A brief discussion is now provided about some of the possible infrastructure that may be associated with architecture 500, according to various embodiments. Architecture 500 includes a processor 520 and a trusted entity 510 for initiating tag frequency changes in the system. Processor 520 includes one or more cores, such as cores 522A and 522B, and a data port 524. Architecture 500 also includes two types of accelerators that are connected to the processor via a root port 530 or a high speed interface 525. A first class of accelerators is connected to the system using peripheral component interconnect express (PCIe). These accelerators eventually connect up to the root port 530 either directly (e.g., accelerator 550) or indirectly (e.g., accelerators 560 and 570) through a sequence of PCIe switches/bridges, such as PCIe switch 540. Another class of accelerators is connected to the system through a different hierarchy and uses a high speed interface 525 to connect to the rest of the system. In FIG. 5, this second class of accelerators includes a high speed accelerator 580.

Trusted entity 510 may be implemented as software, hardware, firmware, or any combination thereof configured to dynamically determine appropriate tag frequencies (e.g., based on a level of security needed for current transactions) and to initiate requests to change the tag frequency of transactions being transmitted across links in the system. For example, trusted entity 510 could be an appropriately configured operating system or virtual machine manager (VMM) of a system. In another example, trusted entity 510 could be implemented as a secure controller in the platform. The trusted entity 510 may be configured with policies to dynamically determine, at any given time, whether the frequency of authentication tags applied to transactions associated with specialized hardware communications should be changed. For example, policies of a trusted entity may require or allow the tag frequency to remain high (e.g., one tag per transaction) during boot time for the system when secrets are typically exchanged. Other policies may require or allow the tag frequency to be reduced when the system is in a steady state during which time secrets are not expected to be exchanged. Reducing the tag frequency during this time can increase bandwidth for the accelerator links to the processor. In at least one embodiment, policies may indicate a change in tag frequency based on tags per a desired number of transactions (e.g., one tag per transaction, one tag per four transactions, etc.). At least one embodiment could implement policies that indicate a change in tag frequency per a desired time frame. In this embodiment, however, the number of transactions per time frame may not be known and has the potential to be a significant number. At least one other embodiment could implement policies that indicate a generic change in tag frequency (e.g., increase, decrease, small increase, small decrease, large increase large decrease, etc.) with configurable cryptographic engines in the system determining how much to increase or decrease the tag frequency.

Accelerators 550, 560, 570, and 580 are attached to processor 520 through one or more links over which data is sent. Accelerators 560 and 570 are attached to PCIe switch 540 via links 564 and 574, respectively. PCIe switch 540 is attached to root port 530 via link 544. Accelerator 550 is attached directly to root port 530 via link 554. High speed accelerator 580 is attached to high speed interface 525 via link 584. Requests to memory from the first class of accelerators (and devices (not shown in the figure)) are fulfilled through the root port. Requests to memory from the second class of accelerators (and devices (not shown in the figure)) are fulfilled through the high speed interface.

Each link (e.g., 544, 554, 564, 574, and 584) has a pair of configurable cryptographic engines (CCEs) to protect data transmitted across that link, which may occur in either direction. Link 554 is provided with a CCE 555A in accelerator 550 and a CCE 555B in root port 530. Link 564 is provided with a CCE 565A in accelerator 560 and a CCE 565B in PCIe switch 540. Link 544 is provided with a CCE 545A in PCIe switch 540 and a CCE 545B in root port 530. Link 584 is provided with a CCE 585A in high speed accelerator 580 and a CCE 585B in high speed interface 525. The disclosed technology, which includes a tag frequency change protocol for a link that enables flexible configuration of tag frequency for data transmitted over the link, is agnostic to the link type being protected. More specifically, in various embodiments, the disclosed technology may be implemented in each pair of cryptographic engines provisioned for a link such that each link is protected with a pair of configurable cryptographic engines (e.g., CCEs 545A-545B, 555A-555B, 565A-565B, 575A-575B, 585A-585B). Hence, the technology is transparent to the link type (e.g., PCIe, high speed interface) where the cryptographic engines are integrated.

In at least one embodiment, each CCE is configured to protect both the confidentiality and integrity of a transaction. A 'transaction' as used herein, is intended to mean a packet containing data that forms all or part of a communication passed over a link from a CCE at one end of the link to a corresponding CCE at the opposite end of the link. A communication may include, but is not necessarily limited to, a memory read, memory write, I/O read, I/O write, completion, or acknowledgement. Each CCE may be configured with an encryption algorithm to encrypt blocks of data to protect its confidentiality. In addition, each CCE may be configured to produce an authentication code, such as a message authentication code (MAC), to protect the integrity of the data the CCE sends over its corresponding link. Authenticating a message (or transaction) can include confirming that the message it is authenticating came from the sender and has not been modified for example, by a third party. Any suitable encryption and authentication scheme may be utilized in the embodiments described herein, based on particular needs and/or implementations.

In one example, Advanced Encryption Standard-Galois Counter Mode (AES-GCM) of operation may be used to provide counter mode encryption of data and a message authentication code for the data. Counter mode encryption uses symmetric key cryptographic block ciphers. Generally, a block cipher is an encryption algorithm that uses a symmetric key to encrypt a block of data in a way that provides confidentiality or authenticity. A counter mode of operation turns a block cipher into a stream cipher. An input block, which is an initialization vector (IV) concatenated with a counter value, is encrypted with a key by a block cipher. The output of the block cipher is used to encrypt (e.g., by an XOR function) a block of plaintext to produce a ciphertext. Successive values of the IV and counter value are used to encrypt successive blocks of plaintext to produce additional blocks of ciphertext.

In addition to producing ciphertext from input data, the GCM operation also calculates a Galois message authentication code (GMAC). A GMAC, which is more generally referred to as a 'tag' or 'authentication tag', is a few bytes of information used to authenticate a message (or transaction). In at least one embodiment, a multiplier function is used to calculate a GMAC based on the ciphertext blocks produced from the encryption of the plaintext blocks. The GMAC can be appended to the ciphertext. While AES-GCM is one possible type of encryption and authentication technique that may be used in one or more embodiments, it should be apparent to those in the art that any other suitable type of encryption and authentication may also be used (e.g., SHA-3, Hash message authentication code (HMAC), etc.).

CCE pairs in architecture 500 work to encrypt and decrypt data in each transaction that is sent over a link. For example, when accelerator 560 obtains data to be sent to a core in processor 520, CCE 565A encrypts blocks of the data and generates transactions with the encrypted data. CCE 565A also generates an authentication tag for the transactions based on a current tag frequency and sends the authentication tag to CCE 565B. A transaction window is defined by the number of transactions that are specified by the current tag frequency to be used to generate an authentication tag and a special (e.g., last) transaction that contains the authentication tag. This special transaction is also referred to herein as 'tag transaction' and 'tag message'. Accelerator 560 sends the transactions to CCE 565B in PCIe switch 540. CCE 565B authenticates the data in the received transactions by decrypting the data and verifying the authentication tag. In one example, CCE 565B may perform verification by generating a reference tag (or MAC) over the encrypted data with GCM and then comparing the reference tag to the authentication tag received with the transaction.

Figure 6A:
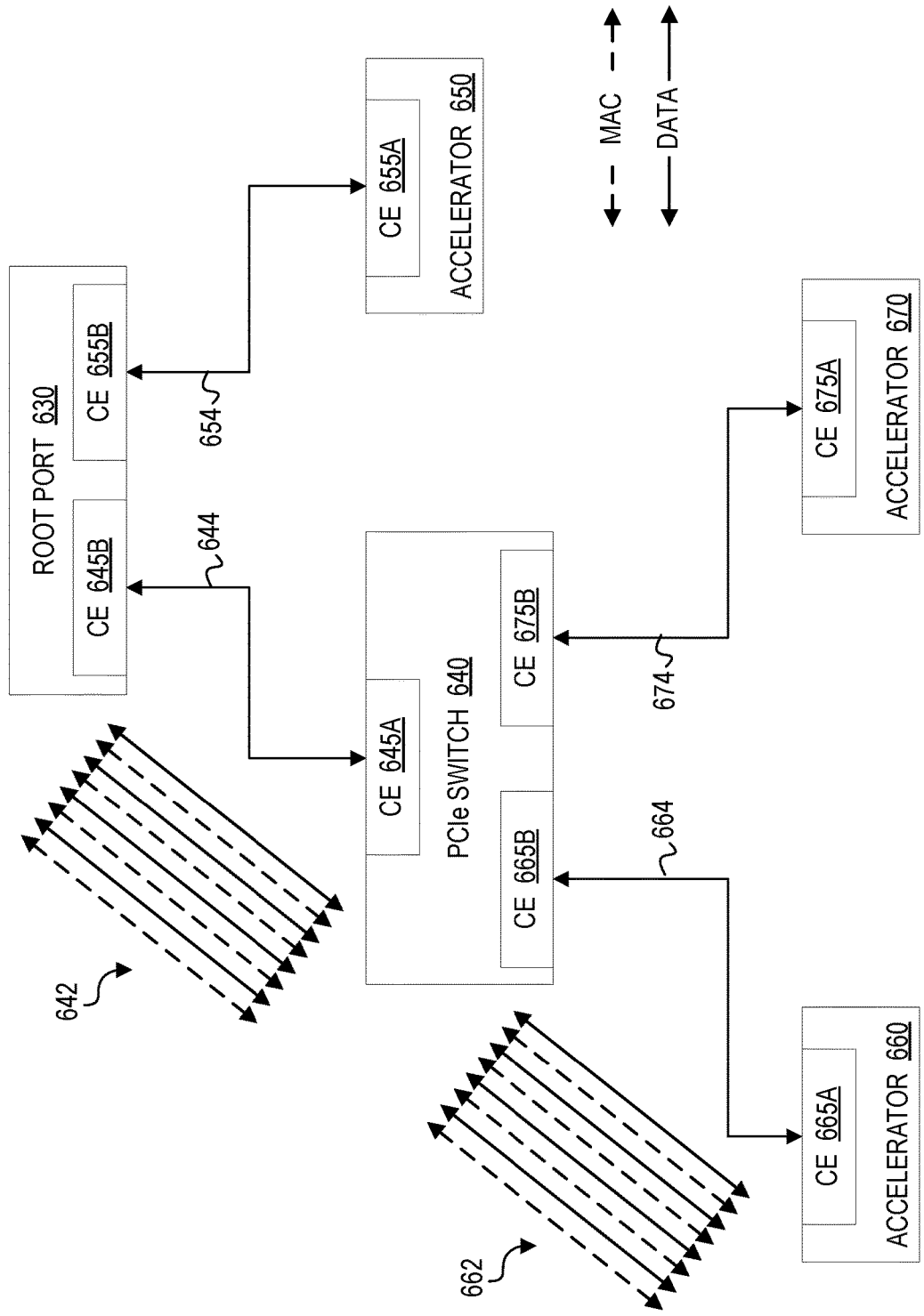
FIG. 6A illustrates example transactions in a typical architecture for a system with link encryption.
Figure 6B:
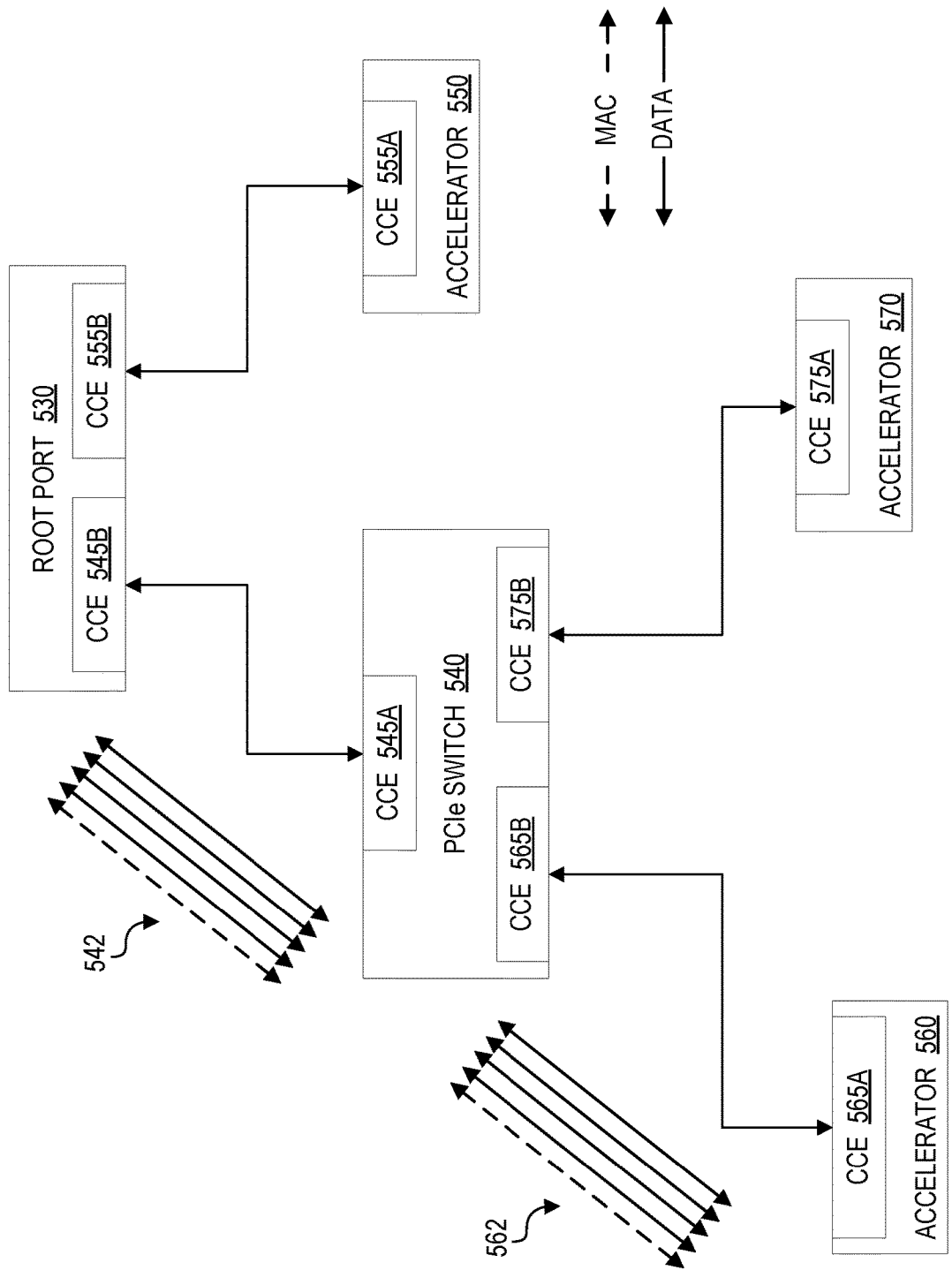
FIG. 6B illustrates example transactions in an architecture for a system with link encryption provisioned with configurable cryptographic engines according to various embodiments.

Turning to FIGS. 6A and 6B, selected components of an architecture with link encryption are shown to illustrate the operations of non-configurable cryptographic engines (CEs) and configurable cryptographic engines (CCEs). FIG. 6A highlights the problem with existing solutions that use non-configurable CEs. FIG. 6A shows a root port 630, a PCIe switch 640, and accelerators 650, 660, and 670, which are connected to the system using peripheral component interconnect express (PCIe). These accelerators connect to root port 630 either directly (e.g., accelerator 650) or indirectly (e.g., accelerators 660 and 670) through a sequence of PCIe switches/bridges, such as PCIe switch 640. Accelerators 650, 660, and 670 are attached to a processor (not shown) through one or more links over which data is sent. Accelerators 660 and 670 are attached to PCIe switch 640 via links 664 and 674, respectively. PCIe switch 640 is attached to root port 630 via link 644. Accelerator 650 is attached directly to root port 630 via link 654. Each link (e.g., 644, 654, 664, and 674) has a pair of crypto engines (CEs) to protect that link. Link 654 is provided with a CE 655A in accelerator 650 and a CE 655B in root port 630. Link 664 is provided with a CE 665A in accelerator 660 and a CE 665B in PCIe switch 640. Link 644 is provided with a CE 645A in PCIe switch 640 and a CE 645B in root port 630.

In the example scenario of FIG. 6A, accelerator 660 has four write transactions to send to memory (not shown). For the purpose of illustration, it is assumed that a single transaction is needed over the interface to send a write transaction to memory. As shown in FIG. 6A, in a current practice, a MAC message is sent with each transaction. Hence, at 662 and 642, the number of transactions doubles for each link, which can severely impact the available bandwidth. Transactions sent by other accelerators (e.g., 650 and 670) could experience the same doubling for each link associated with those accelerators.

FIG. 6B illustrates an advantage of one or more embodiments disclosed herein, in which configurable cryptographic engines (CCEs) are implemented. FIG. 6B shows selected components of architecture 500, in which CCEs are provisioned in accordance with embodiments described herein. FIG. 6B shows root port 530, PCIe switch 540, and accelerators 550, 560, and 570, in which corresponding pairs of CCEs are provisioned (e.g., 545A and 545B, 555A and 555B, 565A and 565B, and 575A and 575B). In this example, the tag frequency change protocol has dynamically configured the CCEs to send a MAC for every four transactions as shown at 542 and 562. Accordingly, only one MAC is sent over four transactions combined. An attack on any of the transactions can still be detected. A slight time gap may occur from the time the erroneous transaction happens to the time it is detected. In accordance with one or more embodiments of the present disclosure, however, for this particular scenario, only one additional transaction for the MAC is sent over each of the links, representing a 4X improvement in bandwidth overheads for link protection.

Figure 7:
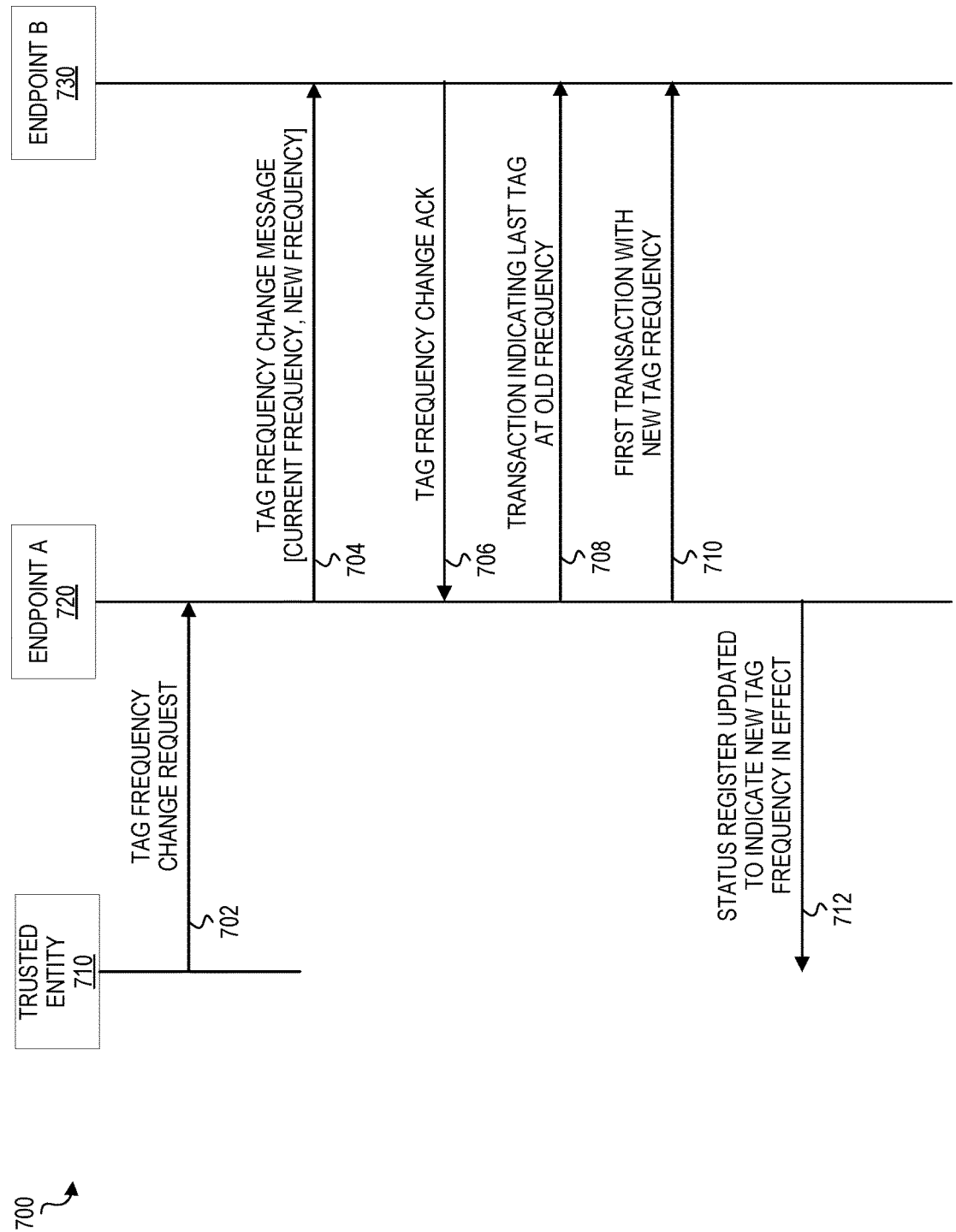
FIG. 7 is a simplified interaction diagram illustrating a tag frequency change protocol to enable a dynamic tag generation frequency change in system with link encryption, according to various embodiments.

Turning to FIG. 7, FIG. 7 is a simplified interaction diagram 700 that illustrates a tag frequency change protocol for dynamically changing a tag frequency for transactions transmitted over a link between a pair of CCEs. FIG. 7 includes a trusted entity 710 and two endpoints, endpoint A 720 and endpoint B 730, which represent two components containing a pair of CCEs. For example, endpoint A 720 could represent accelerator 560 containing CCE 565A, and endpoint B 730 could represent PCIe switch 540 containing CCE 565B. In one or more embodiments, the CCEs of endpoints 720 and 730 may perform one or more operations shown in FIG. 7. In one example, trusted entity 710 represents a secure component on the platform as described with reference to trusted entity 510 in architecture 500. For example, trusted entity 710 could be an operating system/virtual machine manager (OS/VMM) on traditional systems or a security controller or secure processor (e.g., Converged Security and Manageability Engine (CSME)).

As will be appreciated from the description, the tag frequency change protocol illustrated by interaction diagram 700 allows software (e.g., trusted entity 710) to dynamically configure the frequency at which an authentication tag (e.g., MAC, GMAC) is generated, thereby allowing software to control the bandwidth overheads depending on the security requirements of the system at any particular point in time. Accordingly, at 702, trusted entity 710 sends a tag frequency change request to endpoint A 720. It should be noted that a tag frequency change request may also be sent to endpoint B 730. In at least one embodiment, however, the tag frequency change protocol to change the tag frequency is not initiated at an endpoint until the endpoint obtains data that is to be sent to another endpoint. In other embodiments, an endpoint may use dummy transactions when performing the tag frequency change protocol if real-time data is not flowing through the endpoint.

As illustrated, the two endpoints 720 and 730 communicate over a link. At 702, the tag frequency change request from trusted entity 710 is received by endpoint A 720. Additional access control can be implemented inside the endpoints to allow the tag frequency request to be received from only the desired trusted entity and/or to block the tag frequency change request if it originated from an entity other than a trusted entity.

On receiving the tag frequency change request, at 704, the originating endpoint (i.e., endpoint A 720) sends a special message to indicate the tag frequency change is being requested. In at least one embodiment, this message carries the current tag frequency and the new tag frequency requested.

At 706, the receiving endpoint (i.e., endpoint B 730) sends a tag frequency change acknowledgment message to indicate that the original message from endpoint A 720 has been received. It should be noted that the other data/request/completion transactions over the link do not stop as the tag frequency change protocol is executed by the endpoints.

Upon receiving the acknowledgement message at 706, from the receiving endpoint, if a transaction window is currently open, its transactions are sent to the receiving endpoint based on the old frequency. For example, if the old tag frequency is one tag per four transactions, then the transaction window includes four transactions. In this scenario, the originating endpoint A 720 can send all four transactions based on the old tag frequency and generate an authentication tag based on the old tag frequency. At 708, a transaction containing the authentication tag for the open transaction window is sent to endpoint B 730 and indicates to the receiving endpoint B 730 that the current tag is the last tag that it will receive at the old tag frequency. This ensures that both endpoints are synchronized with respect to when the new tag frequency will be in effect. This special message (e.g., tag transaction or tag message) could be indicated with a bit on the transaction which indicates whether the current tag is the last tag at that frequency or not. Post this message, the new frequency is in effect and any transaction received from the originating endpoint A 720 by the receiving endpoint B 730 will use the new tag frequency.

At 710, a first transaction is sent to endpoint B 730 from endpoint A 720 at the new tag frequency. For example, if the new tag frequency is one tag per transaction, then at 710, the first transaction includes a tag generated for only the first transaction. In another example, if the new tag frequency is one tag per five transactions, then the first transaction is the first of five transactions that are to be sent to endpoint B 730, and a tag will be generated based on the five transactions and will be sent to endpoint B in the fifth transaction.

After the new tag frequency is in effect, at 712, the originating endpoint's configurable cryptographic engine can indicate that the frequency change has taken effect by reflecting the change in a status register for software to read. Software can use this indication to start sending transactions based on the level of security they require. For example, software can start sending transactions that require the highest level of security after changing the tag frequency to generate a tag with each request, which is the frequency that provides the highest level of security to the transactions.

It should be noted that in a variant of the implementation, an explicit acknowledgment can be sent from the receiving endpoint to the originating endpoint indicating that the receiving endpoint received the last message at the old frequency before the originating endpoint starts sending messages at new frequency. This could require buffering in endpoints but can add robustness for links which can re-order transactions.

It should be further noted that coming out of reset, the configurable cryptographic engines might be configured to send the transactions at maximum security, i.e., a tag per transaction. This can later be overridden by software based on its security requirements.

Figure 8:
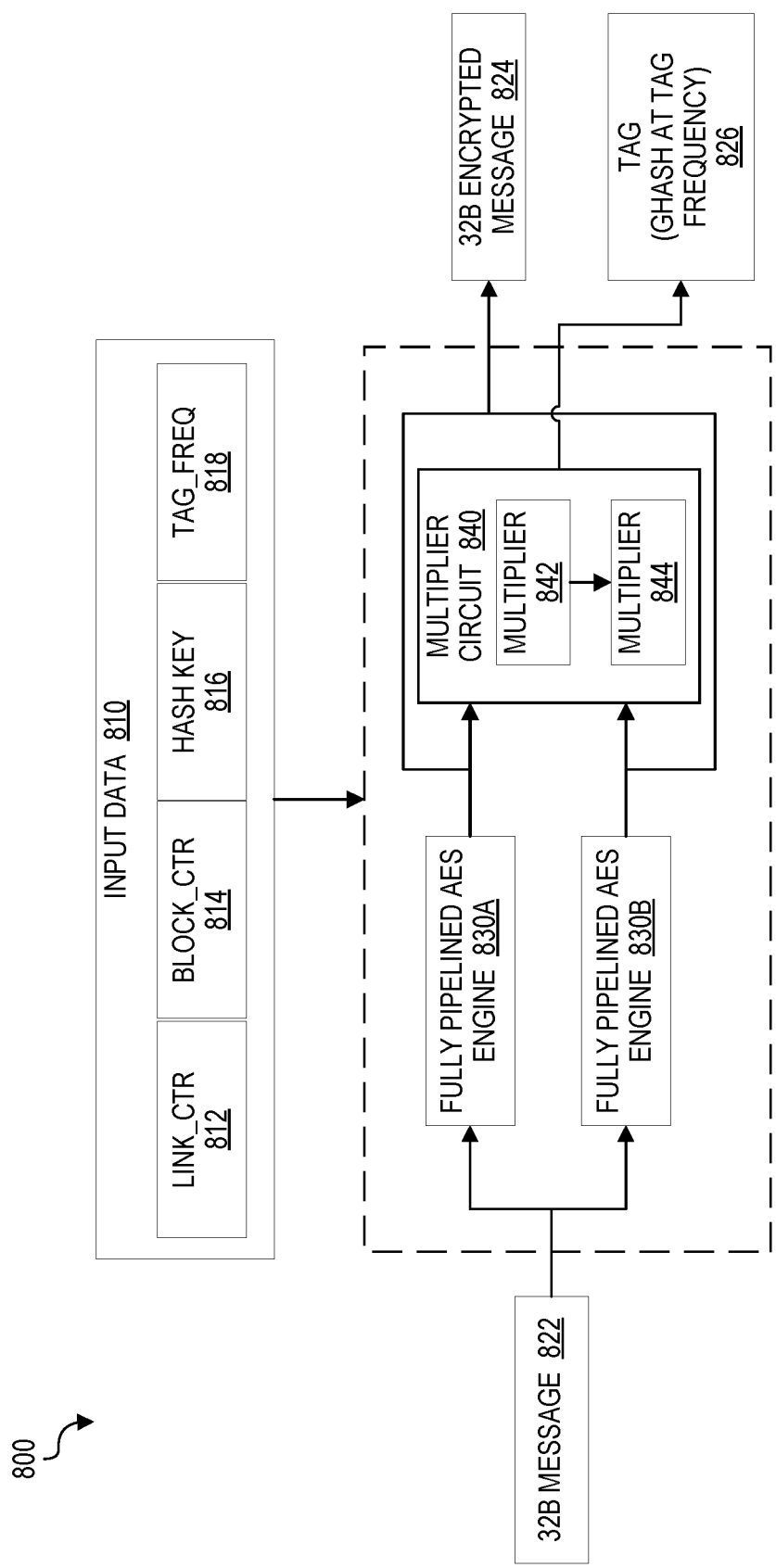
FIG. 8 is a simplified block diagram illustrating an example pipeline of a configurable cryptographic engine according to various embodiments.

FIG. 8 shows an example design of a cryptographic pipeline 800 that may be implemented with a configurable cryptographic engine (e.g., 545A, 545B, 555A, 555B, 565A, 565B, 575A, 575B, 585A, 585B). Cryptographic pipeline 800 facilitates a tag frequency change protocol to dynamically configure tag frequency, according to various embodiments. For ease of understanding, cryptographic pipeline 800 uses Advanced Encryption Standard in Galois/Counter Mode (AES-GCM) as an example of transport layer security (TLS) authenticated encryption, but the present disclosure is not so limited. In alternate embodiments, the cryptographic pipeline may use any other suitable encryption and authentication schemes.

In various embodiments, and in the example of FIG. 8, a link interface is a 32B link interface. Since Advanced Encryption Standard (AES) works at 16B granularity, two fully pipelined AES engines 830A and 830B may be provisioned for encryption. This allows the AES engines to operate on a 32 byte message, such as 32B message 822, in parallel. The AES engines 830A and 830B each produce 16B of data, which can be combined (e.g., concatenated) to generate a 32B encrypted message, such as 32B encrypted message 824. A multiplier circuit 840 with multiplier components 842 and 844 is used to generate a tag 826 (e.g., Galois message authentication code), which in the case of AES-GCM, is generated using a GHASH algorithm. Accordingly, tag 826 is also referred to as a GHASH. A GHASH algorithm is part of a class of Wegman-Carter polynomial universal hashes that operate in the field $GF(2^{128})$.

Several types of input data 810 are used in pipeline 820. The tag is generated based on a parameter selected by software. The parameter (shown as TAG_FREQ 818) represents a frequency at which a tag is generated and is updated each time a request to change the tag frequency is propagated to the configurable cryptographic engines (e.g., from software such as trusted entity 510). The tag frequency is defined as the number of transactions for which a tag is to be generated. A hash key 816 may be part of the static construction of cryptographic pipeline 800. A key of the configurable cryptographic engines, represented as K, can be used to encrypt all zeros to generate hash key 816, represented by $H=E(K,0^{128})$. The hash key H can be used to generate an authentication tag. The key K can be used in the operations to encrypt each block of data, where each encrypted block of data is to be to be included in a transaction.

In order to implement authenticated encryption, a running counter is maintained, which is used as an initialization vector (IV). The IV (shown as LINK_CTR 812) is initialized to zero and incremented at every tag frequency. Accordingly, all transactions covered with the same tag use the same IV. Another counter value is incremented for each 16B block processed by the AES pipeline. This counter (shown as BLOCK_CTR 814) is concatenated with the LINK_CTR 812 to form the counter used for counter-mode encryption. While the LINK_CTR 812 is incremented at tag frequency interval the BLOCK_CTR 814 is incremented for every 16B block inside a tag frequency interval. A tag frequency interval defines a 'transaction window,' during which one or more transactions covered by the same tag are generated and transmitted to a receiving endpoint. The running tag 826 is sent out every tag frequency interval at which point the LINK_CTR 812 is incremented and BLOCK_CTR 814 is reset to zero. It should be noted that there can be multiple virtual channels implemented on an interface for quality of service reasons. In this case the configurable cryptographic engine will support multiple counters, one per virtual channel to ensure proper order between virtual channels.

Figure 9:
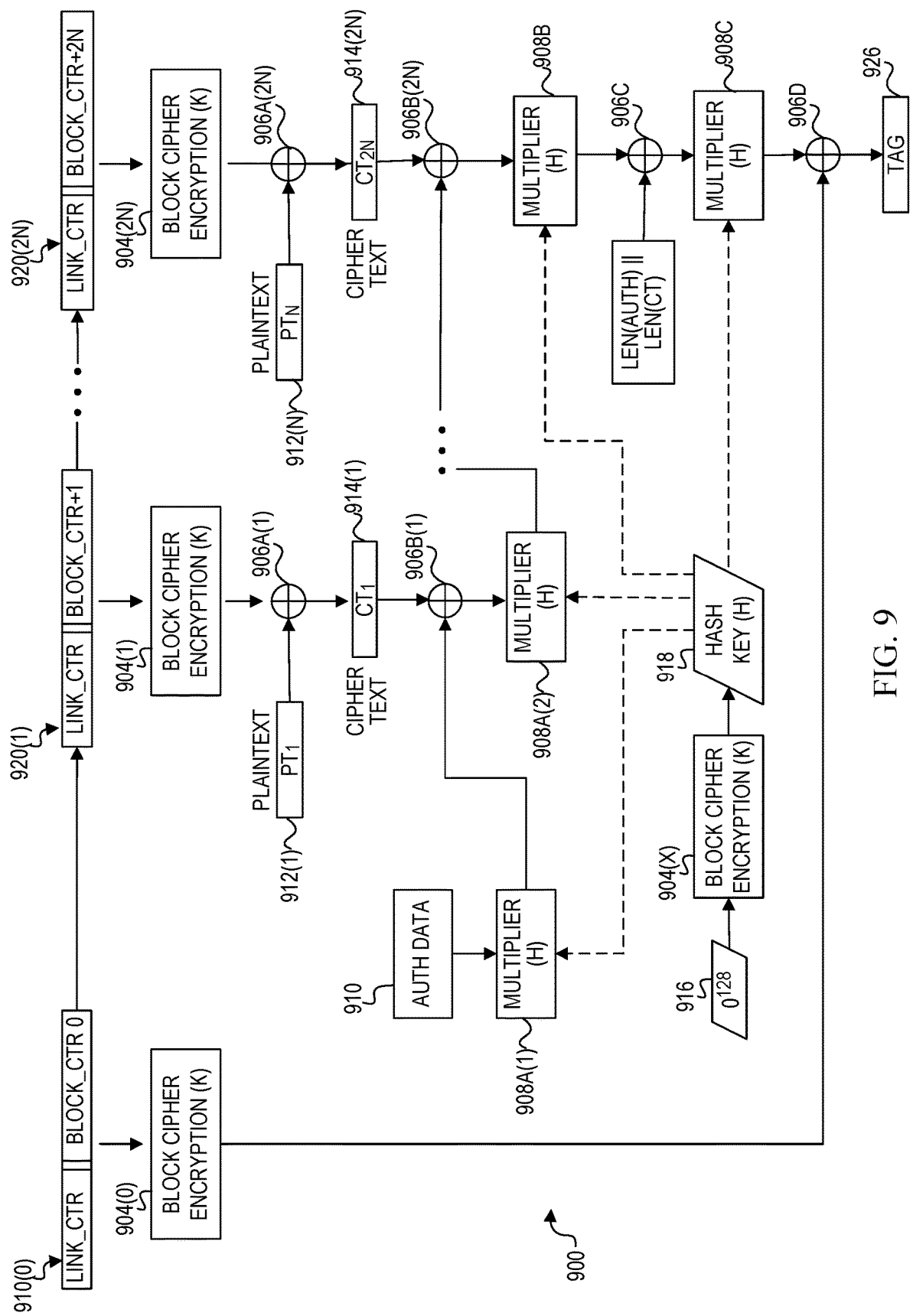
FIG. 9 is a block diagram illustrating an Advanced Encryption Standard for Galois/Counter mode encryption that may be associated with at least one embodiment.

FIG. 9 is a block diagram illustrating additional possible details about an Advanced Encryption Standard in Galois/Counter Mode (AES-GCM) algorithm 900, which may be implemented in one or more embodiments described herein. In one example, AES engines 830A and 830B and multiplier circuit 840 of cryptographic pipeline 800 in FIG. 8 may perform one or more operations of the AES-GCM algorithm 900 in at least one embodiment. AES-GCM is an example of a block cipher mode of operation that can effectively operate as a stream cipher by applying block cipher encryption to each new block of data to be sent from one endpoint to another endpoint across a link (e.g., 544, 554, 564, 574, 584) in a system with link encryption (e.g., 500). The AES-GCM algorithm produces ciphertext outputs (e.g., $CT_1$ 914(1) through $CT_{2N}$ 914(2N)) that are sent via transactions across the link. AES-GCM algorithm 900 also generates an authentication tag 926 based on a configurable tag frequency of one tag per N transactions.

In AES-GCM algorithm 900, successive block cipher encryptions 904(0) and 904(1) through 904(2N) are performed as part of encrypting 2N blocks of input data, where N is the number of transactions that define the tag frequency (e.g., one tag per N transactions). In at least one embodiment, each block cipher encryption 904(0)-904(2N) is performed by executing the same encryption algorithm (e.g., AES) with the same key (K) and different input blocks 910(0)-910(2N). Input block 910(0) can comprise a link counter (LINK_CTR) and a block counter (BLOCK_CTR). The link counter is an initialization vector initially set to zero. The block counter is incremented (e.g., by +1) for each successive block cipher encryption performed during one cycle (or interval) of the tag frequency. The link counter is incremented at every tag frequency (e.g., after generating N transactions and one authentication tag).

In this example, the link interface is 32 bytes (32B), which allows 32B transactions to be sent over the link. However, each block cipher encryption 904(0), 904(1)-904(2N) and 904(X) operates on 16 bytes (16B) of data. Accordingly, each block of input data is divided into plaintext blocks 912(1)-912(2N) for encrypting into 16B ciphertext blocks 914(1)-914(2N). Pairs of the 16B ciphertext blocks can be concatenated for each transaction.

The encrypted output of the first block cipher encryption 940(0) is used in an exclusive OR (XOR) operation 906D to generate the authentication tag 926 after completion of the other block cipher encryptions 904(1)-904(2N) during the tag frequency cycle. Exclusive OR (XOR) operations 906A(1)-906A(2N) are performed on plaintext blocks 912(1)-912(2N) and encrypted outputs of block cipher encryptions 904(1)-904(2N). The XOR operations 906A(1)-906A(2N) generate ciphertexts 914(1)-914(2N), respectively. In this example, with a 32B link interface, each successive pair of ciphertexts 914(1)-914(2N) may be concatenated (or otherwise suitably combined) for one transaction to be sent over the link.

Ciphertexts 914(1)-914(2N) are also used to generate authentication tag 926. Exclusive OR operations 906B(1)-906B(2N) are applied to the ciphertexts 914(1)-914(2N) and respective outputs from multiplier circuits 908A(1)-908A(2N). Multiplier circuits 908A(2)-908A(2N), 908B, and 908C perform binary field multiplication based on a hash key (H) 918 and output data from a prior multiplier operation. Multiplier circuit 908A(1) performs binary field multiplication based on hash key (H) 918 and authentication data. Multiplier circuit 908C performs binary field multiplication based on output from the last multiplier circuit 908B and the length of a ciphertext block concatenated with the length of authentication data 910. The hash key (H) 918 is generated by applying block cipher encryption 904(X) based on hash key (K) and an input vector of $0^{128}$. The output from the block cipher encryption is hash key (H) 918, which is provided to each multiplier circuit 908A(1)-908A(2N), 908B, and 908C.

Authentication tag 926 (or GHASH) is generated from an exclusive OR operation 906D applied to the output of multiplier 908C and the output of block cipher encryption 908A(0). A transaction containing the authentication tag 926 can be sent across the link after the last data transaction (e.g., the last pair of ciphertexts 914(2N) and 914(2N-1)). Once the authentication tag 926 is generated, the transaction window is closed, and the link counter can be incremented (e.g., by +1) and the block counter can be reset (e.g., to 0). When new input data to be sent over the link is obtained, a new transaction window is opened for a next cycle of transactions, and the AES-GCM algorithm can be applied to new input data based on the tag frequency (e.g., one tag per N transactions).

Figure 10:
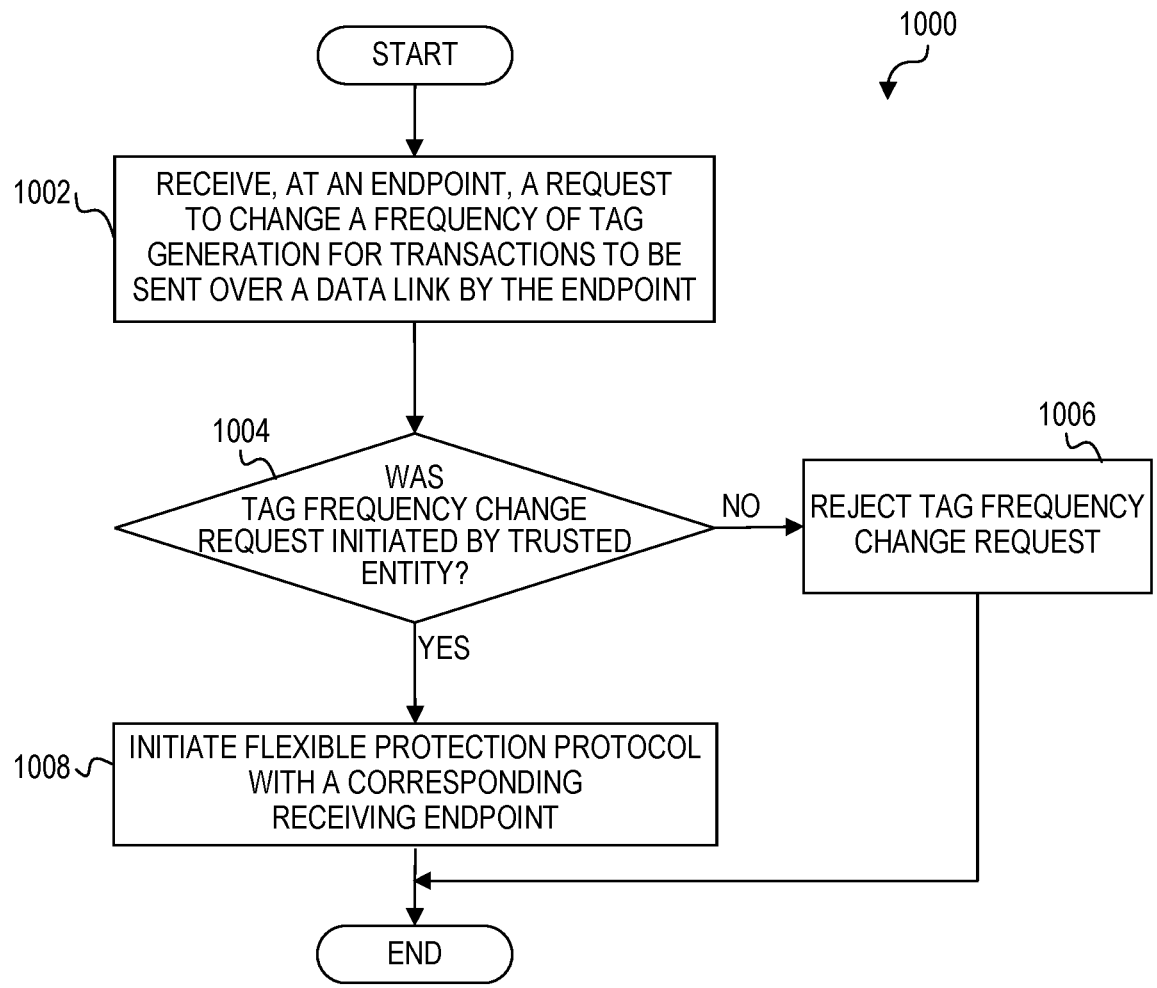
FIG. 10 is a simplified flow chart illustrating an example technique that may be associated with receiving a request to change a tag frequency according to various embodiments.
Figure 11:
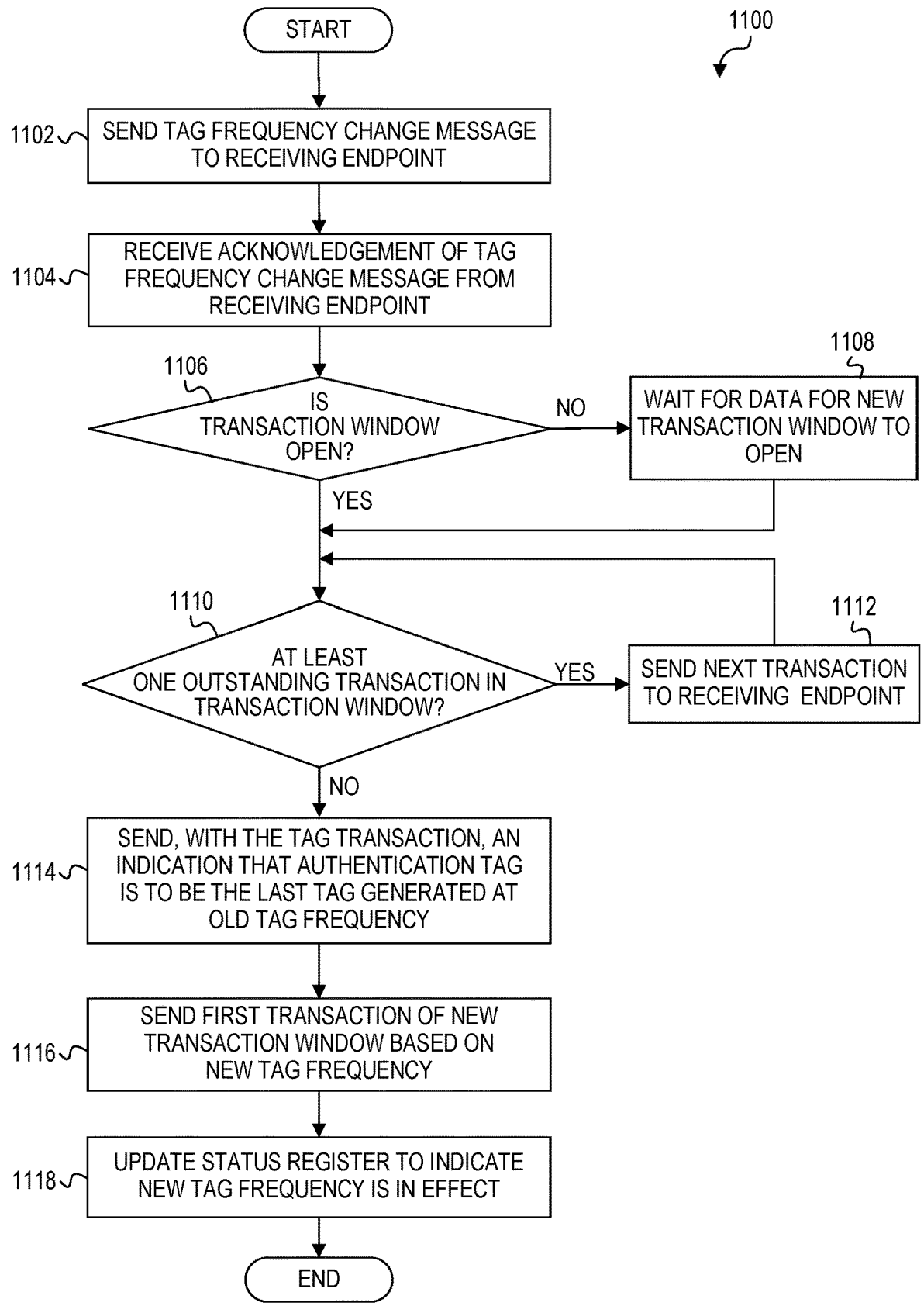
FIG. 11 is a simplified flow chart illustrating an example technique that may be associated with performing a tag frequency change protocol to dynamically change a tag frequency according to various embodiments.
Figure 12:
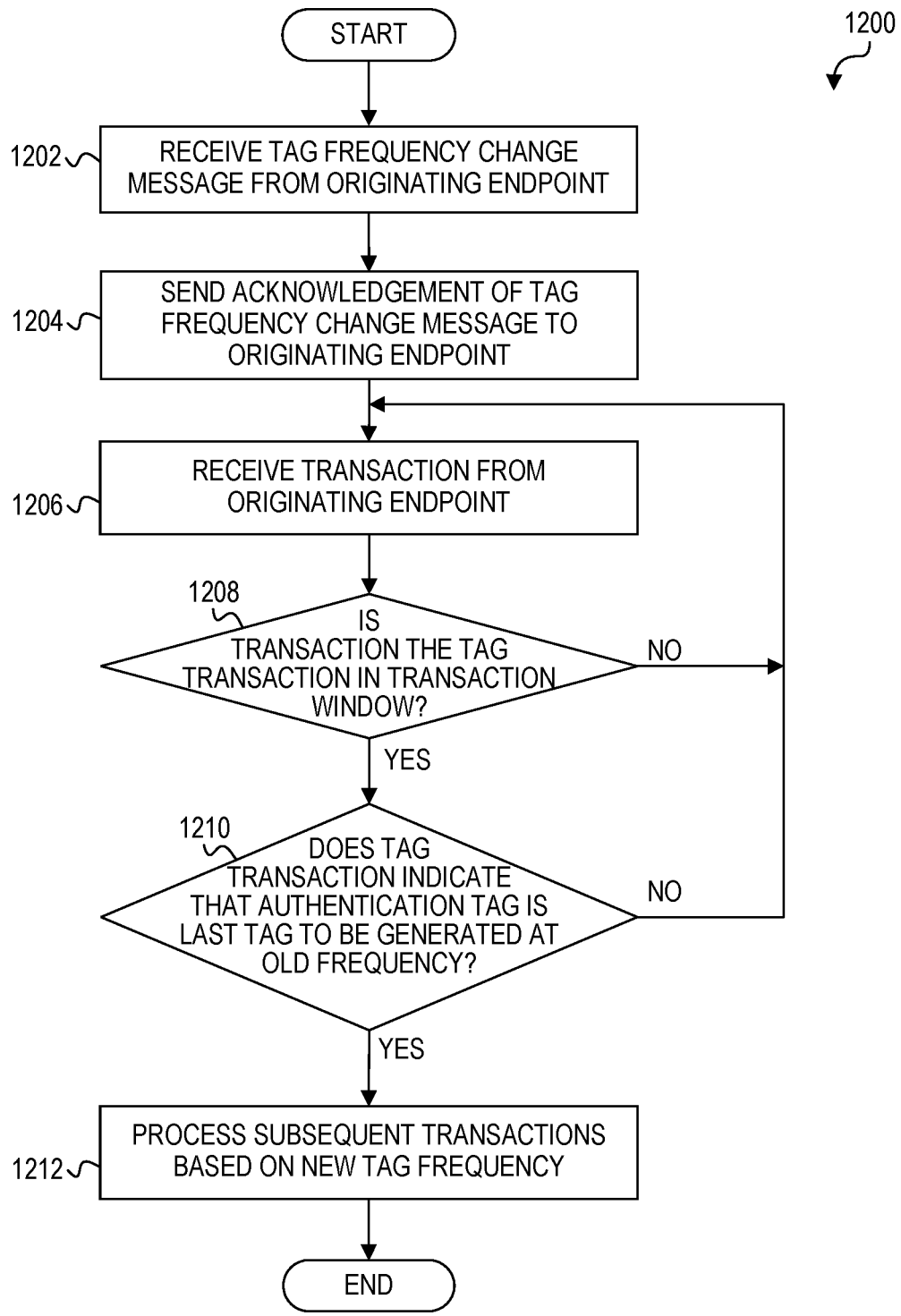
FIG. 12 is a simplified flow chart illustrating another example technique that may be associated with a tag frequency change protocol according to various embodiments.

FIGS. 10, 11, and 12 show simplified flowcharts 1000, 1100, and 1200, respectively, illustrating example techniques associated with a system with link encryption providing a tag frequency change protocol for dynamically changing tag frequencies. In at least one embodiment, one or more sets of operations correspond to activities of FIGS. 10-12. An endpoint containing a configurable cryptographic engine (e.g., 145A, 145B, 155A, 155B, 165A, 165B, 175A, 175B, 185A, 185B), or a portion thereof, may utilize the one or more sets of operations. Examples of endpoints containing configurable cryptographic engines may include, but are not necessarily limited to, a root port (e.g., 530), a PCIe switch (e.g., 540), an accelerator (e.g., 550, 560, 570, 580), and a high speed interface (e.g., 525). CCEs may comprise hardware, firmware, or a combination thereof for performing one or more of the operations.

In at least one embodiment, operations indicated in flowchart 1000 of FIG. 10, or a portion thereof, may be performed by a CCE in an originating endpoint. Other components of the originating endpoint may perform one or more operations indicated in flowchart 1000 including, for example, a protocol stack (e.g., 200) of the originating endpoint. An originating endpoint is any endpoint with a CCE that receives a request to change a tag generation frequency of transactions sent over a link to a corresponding CCE in a receiving endpoint, and that has received or otherwise obtained data to be sent over the link to the corresponding CCE in the receiving endpoint.

At 1002, an endpoint receives, from a trusted entity (e.g., 510), a request to change a frequency of tag generation for transactions to be sent over a data link by the endpoint. In one example, the trusted entity may be software such an operating system or a virtual machine manager. In another example, the trusted entity may be a security controller. In one example, the request to change a tag frequency includes an indication of a new tag frequency to be used to generate authentication tags for transactions. A new tag frequency, which differs from a current tag frequency, effectively changes the level of security (e.g., integrity protection) of data transmissions by changing the frequency at which authentication tags are generated. For example, if an endpoint is currently generating one authentication tag for each transaction, and if the request to change the tag frequency indicates a new tag frequency of generating five transactions per one authentication tag, then the change of frequency from one authentication tag per one transaction to one authentication tag per five transactions effectively lowers the level of security (e.g., integrity protection) of the transactions. This may desirable during periods when limited amounts of confidential data are being transmitted and higher bandwidth is needed. In other possible examples, a more general request may be made by the trusted entity to change the tag frequency by increasing or decreasing tag frequency by a certain amount (e.g., increase by 2 transactions for one authentication tag, etc.).

At 1004, a determination is made as to whether the request to change the frequency of tag generation was initiated by a trusted entity. If it is determined that the request to change the tag frequency was not initiated by a trusted entity, then at 1006, the CCE in the originating endpoint can reject the request to change the tag frequency for transactions to be transmitted over the link and may continue to use the current tag frequency for generating authentication tags for transactions to be transmitted over the link.

If, at 1004, it is determined that the request to change the frequency of tag generation was initiated by a trusted entity, then at 1008, a tag frequency change protocol may be initiated with a corresponding receiving endpoint. The receiving endpoint is an endpoint that contains a CCE and that communicates over a link with the originating CCE. Example activities associated with an embodiment of a tag frequency change protocol are illustrated in FIGS. 11-12.

FIG. 11 shows simplified flowchart 1100, which illustrates example techniques associated with a tag frequency change protocol in a system with link encryption. In at least one embodiment, operations indicated in flowchart 1100 of FIG. 11, or a portion thereof, may be performed by a CCE in an originating endpoint after receiving a request to change the frequency of tag generation for transactions to be sent over a link and determining that the request was initiated by a trusted entity. Other components of the originating endpoint may perform one or more operations indicated in flowchart 1100 including, for example, a protocol stack (e.g., 200) of the originating endpoint. The CCE in the originating endpoint may initiate the tag frequency change protocol with the corresponding CCE at the other end of the link.

At 1102, the originating endpoint sends a tag frequency change message to the receiving endpoint. In one example, the tag frequency change message includes two parameters: a current tag frequency and a new tag frequency. The current tag frequency may be the tag frequency at which authentication tags are currently being generated by the originating endpoint for transactions sent over the link to the receiving endpoint.

At 1104, the originating endpoint receives, from the receiving endpoint, an acknowledgement message indicating receipt of the tag frequency change message by the receiving endpoint.

At 1106, a determination is made as to whether a transaction window is open. A 'transaction window' as used herein, is based on a tag frequency interval or cycle, which is defined by the number of transactions specified for one authentication tag. Generally, a transaction window is a period during which a number of transactions specified by a current tag frequency to be integrity-protected by one authentication tag are generated and sent to a receiving endpoint. For example, if the current tag frequency in a system is one authentication tag per five transactions, then a transaction window is the period during which data for the five transactions is obtained, the five transactions are generated and sent by the originating endpoint to the receiving endpoint, and an authentication tag for the five transactions is generated and sent by the originating endpoint to the receiving endpoint. This transaction window is 'open' after at least a portion of the data to be sent to the receiving endpoint has been obtained by the originating endpoint and before a tag transaction containing the authentication tag for the five transactions has been sent to the receiving endpoint. Accordingly, in this embodiment, a transaction window is open (or the frequency interval lasts) as long as an authentication tag has not been sent to the receiving endpoint.

At 1106, if it is determined that the transaction window is not open (e.g., no data is currently being transmitted and no data has been received that is to be transmitted in a new transaction window), then at 1108, the originating endpoint waits until data is obtained that is to be transmitted to the receiving endpoint within a new transaction window.

At 1106, if it is determined that a transaction window is open (e.g., originating endpoint has data to send to receiving endpoint and an authentication tag has not been sent for that data), or if data for a new transaction window has been obtained at 1108, then flow passes to 1110.

At 1110, a determination is made as to whether at least one transaction in the transaction window is outstanding. If one or more transactions in the transaction window are outstanding (i.e., have not been sent to the receiving endpoint), then the tag frequency is not changed until the transaction window closes. For example, if the tag frequency specifies one authentication tag per five transactions, and only two transactions have been sent to the receiving endpoint, then the tag frequency is not changed until the three outstanding transactions are sent to the receiving endpoint (or until three dummy transactions are sent to the receiving endpoint), so that the authentication tag can be generated, and the transaction window can close. In one example, a determination as to whether any transactions are outstanding can be made by determining whether a next transaction to be sent to the receiving endpoint is a tag transaction for the transaction window.

If, at 1110, it is determined that at least one transaction in the transaction window is outstanding, then at 1112 the next transaction is sent to the receiving endpoint and flow returns to 1110 to determine whether there are any outstanding transactions remaining in the transaction window. The flow to 1112 and back to 1110 continues until it is determined at 1110 that there are no more outstanding transactions in the transaction window.

In some embodiments, at 1112, dummy transactions may be sent to the receiving endpoint rather than transactions with real data. This may advantageously cause an open transaction window to close if there are no transactions flowing from the originating endpoint to the receiving endpoint. If a transaction window is not currently open, at 1108, a transaction window may be forced open so that dummy transactions can be used to cause the transaction window to close. It is desirable to close a transaction window during a tag frequency change protocol because, in at least one embodiment, doing so enables the tag frequency change to be completed so that the new tag frequency can be applied to subsequent transactions. In some embodiments, a time threshold may be used to determine whether to send one or more dummy transactions.

Once it is determined at 1110 that there are no further outstanding transactions in the transaction window, then at 1114, upon the originating endpoint generating an authentication tag for the transactions in the transaction window, a tag transaction is sent with the authentication tag and an indication that the authentication tag is the last authentication tag that will be generated based on the old tag frequency.

At 1116, a first transaction of a new transaction window is sent from the originating endpoint to the receiving endpoint based on the new tag frequency.

At 1118, the originating endpoint can update a status register to indicate the new tag frequency is in effect. Accordingly, the tag frequency change protocol is finished until the next request to change the tag frequency is received from the trusted entity.

In an illustrative example, if a current tag frequency is one tag per five transactions, and an acknowledgement message is received by the originating endpoint after only one transaction has been sent to the receiving endpoint, then the protocol allows second, third, fourth, and fifth transactions to be sent before sending a tag transaction containing an authentication tag for the five transactions and an indication that the authentication tag is the last tag that will be generated by the originating endpoint using the old frequency.

In another embodiment using dummy transactions, assume an originating endpoint and a receiving endpoint are using an old tag frequency of five, and two transactions have been sent from the originating endpoint to the receiving endpoint. If a tag frequency change is requested from five transactions down to one transaction, three dummy transactions can be inserted and sent from the originating endpoint to the receiving endpoint to allow the current transaction window using the old tag frequency to close. Accordingly, after the three dummy transactions are sent, a tag transaction containing an authentication tag for the five transactions and an indication that the authentication tag is the last tag that will be generated by the originating endpoint using the old frequency can be sent by the originating endpoint to the receiving endpoint.

FIG. 12 shows simplified flowchart 1200, which illustrates example techniques associated with a tag frequency change protocol in a system with link encryption. In at least one embodiment, operations indicated in flowchart 1200 of FIG. 12, or a portion thereof, may be performed by a CCE in a receiving endpoint when an originating endpoint initiates a tag frequency change protocol with the receiving endpoint. More particularly, in at least one embodiment, a corresponding CCE in the originating endpoint may initiate the tag frequency change protocol with the CCE in the receiving endpoint. Other components of the receiving endpoint may perform one or more operations indicated in flowchart 1200 including, for example, a protocol stack (e.g., 200) of the receiving endpoint.

At 1202, a receiving endpoint receives a tag frequency change message from an originating endpoint. In one example, the tag frequency change message includes two parameters: a current tag frequency and a new tag frequency. The current tag frequency may be the tag frequency at which authentication tags are currently being generated by the originating endpoint for transactions sent over the link to the receiving endpoint.

At 1204, the receiving endpoint sends, to the originating endpoint, an acknowledgement message indicating receipt of the tag frequency change message by the receiving endpoint.

At 1206, the receiving endpoint receives a transaction from the originating endpoint. At 1208, a determination is made as to whether the transaction is a tag transaction with an authentication tag for one or more transactions in a transaction window. If it is determined that the received transaction is not a tag transaction for the current transaction window, then the activities of the receiving endpoint continue at 1206, where the next transaction is received from the originating endpoint. This loop may continue until a received transaction is detected as the tag transaction for the current transaction window, and flow passes to 1210.

At 1210, if it is determined that the tag transaction does not indicate that its authentication tag is the last tag to that will be generated at the old tag frequency (e.g., if the received transaction was generated before the originating endpoint received the acknowledgement message from the receiving endpoint, etc.), then activities of the endpoint may continue at 1206, where the next transaction is received from the originating endpoint. In this case, the next transaction that is received may be the first transaction of a new transaction window, which is still based on the old tag frequency. This loop may continue until a received transaction is detected as the tag transaction of a current transaction window and determined to indicate that its authentication tag is the last tag that will be generated at the old frequency. In at least one embodiment, a bit in the tag transaction may be set to indicate that the authentication tag is the last tag that is to be generated at the old frequency.

At 1210, if it is determined that the received transaction indicates that its authentication tag is the last tag to be generated at the old frequency, then at 1212, the receiving endpoint begins processing subsequent transactions based on the new tag frequency. In particular, in a subsequent transaction window defined by a new number of transactions according to the new tag frequency, the receiving endpoint uses the authentication tag it receives to verify the integrity of the new number transactions in the transaction window.

In some embodiments, each endpoint of a pair of endpoints connected to opposite ends of a link separately initiates the tag frequency change protocol to change the tag frequency for transactions sent by that endpoint over the link. For example, the receiving endpoint described with reference to FIG. 12 (e.g., endpoint B 730 of FIG. 7) may also operate as an originating endpoint and perform operations of the tag frequency change protocol described with reference to FIGS. 10-11 to change the tag frequency for transactions sent by that endpoint (e.g., endpoint B 730 of FIG. 7) over the link.

In other embodiments, changing the tag frequency for transactions sent in one direction over a link can act as a trigger to change the tag frequency for transactions sent in the opposite direction over the link. In this embodiment, the tag frequency change protocol may be initiated by a receiving endpoint at any point after the receiving endpoint receives a tag frequency change message from the originating endpoint (e.g., at 1202). For example, once the tag frequency is changed in endpoint B 730 (e.g., at 1212), endpoint B can send a tag frequency change message to endpoint A 720 (e.g., 1102) and can perform some or all of the operations shown in FIG. 11 to achieve the tag frequency change for transactions flowing from endpoint B 730 to endpoint A 720. In another example, endpoint B can perform some or all of the operations shown in FIG. 11 to achieve the tag frequency change for transactions flowing from endpoint B 730 to endpoint A 720 in response to receiving the tag frequency change message from endpoint A (e.g., at 1202).

Turning to FIGS. 13-16, FIGS. 13-16 are block diagrams of exemplary computer architectures that may be used in accordance with embodiments (e.g., system 500 with link encryption providing a tag frequency change protocol for dynamically changing the frequency of generating authentication tags) disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of a system with link encryption providing a tag frequency change protocol for dynamically changing tag frequencies, as described herein. Generally, suitable computer architectures for embodiments disclosed herein can include, but are not limited to, configurations illustrated in FIGS. 13-16.

Figure 13:
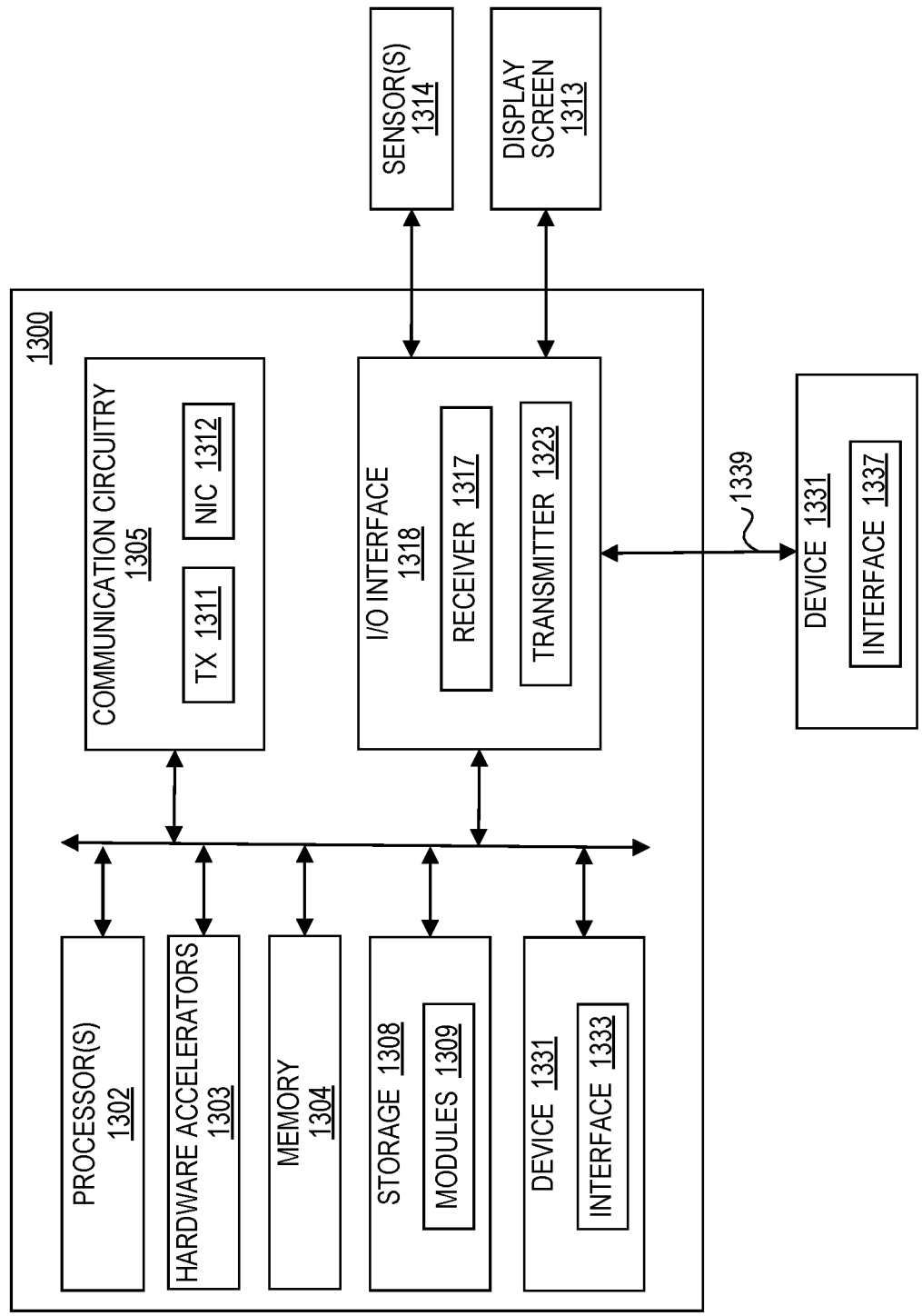

FIG. 13 illustrates an example device suitable for use to practice various programmatic aspects of the present disclosure, in accordance with various embodiments. The device 1300 may be used to implement programmatic aspects of the disclosed methodology. As shown, the device 1300 may include one or more processors 1302, each having one or more processor cores, or and one or more hardware accelerators 1303 (which may be an ASIC or a FPGA). In alternate embodiments, one or more of the hardware accelerator 1303 may be part of processor 1302 or integrated together on a system-on-a-chip (SOC). In various embodiments, processors 1302 and hardware accelerators 1303 are incorporated with the tag frequency change protocol technology of the present disclosure, as earlier described, to protect data transmitted over the links between processors 1302 and hardware accelerators 1303.

Additionally, the device 1300 may include a memory 1304, which may be any one of a number of known persistent storage medium, and a data storage circuitry 1308 including modules 1309. In addition, the 1300 may include an I/O interface 1318, coupled to one or more sensors 1314, and a display screen 1313. The I/O interface 1318 may include a transmitter 1323 and a receiver 1317. Furthermore, the device 1300 may include communication circuitry 1305 including a transceiver (Tx) 1311, and network interface controller (NIC) 1312. The elements may be coupled to each other via system bus 1306, which may represent one or more buses. In the case of multiple buses, they may be bridged by one or more bus bridges (not shown). A device 1331 may be coupled to the system bus 1306, and a device 1335 may be coupled to a computer bus 1339. The device 1331 may include an interface 1333, and the device 1335 may include an interface 1337.

In embodiments, the processor(s) 1302 (also referred to as "processor circuitry 1302") may be one or more processing elements configured to perform basic arithmetical, logical, and input/output operations by carrying out instructions. Processor circuitry 1302 may be implemented as a stand-alone system/device/package or as part of an existing system/device/package. The processor circuitry 1302 may be one or more microprocessors, one or more single-core processors, one or more multi-core processors, one or more multithreaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 1302 may be a part of a SoC in which the processor circuitry 1302 and other components discussed herein are formed into a single IC or a single package. As examples, the processor circuitry 1302 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor (s); and/or the like.

In embodiments, the processor circuitry 1302 may include a sensor hub, which may act as a coprocessor by processing data obtained from the one or more sensors 1314. The sensor hub may include circuitry configured to integrate data obtained from each of the one or more sensors 1314 by performing arithmetical, logical, and input/output operations. In embodiments, the sensor hub may capable of timestamping obtained sensor data, providing sensor data to the processor circuitry 1302 in response to a query for such data, buffering sensor data, continuously streaming sensor data to the processor circuitry 1302 including independent streams for each sensor of the one or more sensors 1314, reporting sensor data based upon predefined thresholds or conditions/triggers, and/or other like data processing functions.

In embodiments, the memory 1304 (also referred to as "memory circuitry 1304" or the like) may be circuitry configured to store data or logic for operating the computer device 1300. The memory circuitry 1304 may include number of memory devices may be used to provide for a given amount of system memory. As examples, the memory circuitry 1304 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package, dual inline memory modules (DIMMs) such as microDIMMs or Mini-DIMMs, and/or any other like memory devices. To provide for persistent storage of information such as data, applications, operating systems and so forth, the memory circuitry 1304 may include one or more mass-storage devices, such as a solid state disk drive (SSDD); flash memory cards, such as SD cards, microSD cards, xD picture cards, and the like, and USB flash drives; on-die memory or registers associated with the processor circuitry 1302 (for example, in low power implementations); a micro hard disk drive (HDD); three dimensional cross-point (3D XPOINT) memories from Intel® and Micron®, etc.

Where FPDs are used, the processor circuitry 1302 and memory circuitry 1304 (and/or data storage circuitry 1308) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 1302 to implement various logic functions. The memory cells may include any combination of various levels of memory/storage including, but not limited to, EPROM, EEPROM, flash memory, SRAM, anti-fuses, etc.

In embodiments, the data storage circuitry 1308 (also referred to as "storage circuitry 1308" or the like), with shared or respective controllers, may provide for persistent storage of information such as modules 1309, operating systems, etc. The data storage circuitry 1308 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 1302; hard disk drives (HDDs); micro HDDs; resistance change memories; phase change memories; holographic memories; or chemical memories; among others. As shown, the data storage circuitry 1308 is included in the computer device 1300; however, in other embodiments, the data storage circuitry 1308 may be implemented as one or more devices separated from the other elements of computer device 1300.

In some embodiments, the data storage circuitry 1308 may include an operating system (OS) (not shown), which may be a general purpose operating system, or an operating system specifically written for and tailored to the computer device 1300. The OS may include one or more drivers, libraries, and/or application programming interfaces (APIs), which provide program code and/or software components for modules 1309 and/or control system configurations to control and/or obtain/process data from the one or more sensors 1314.

The modules 1309 may be software modules/components used to perform various functions of the computer device 1300 and/or to carry out functions of the example embodiments discussed herein. In embodiments where the processor circuitry 1302 and memory circuitry 1304 includes hardware accelerators (e.g., FPGA cells, the hardware accelerator 1303) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 1309 may comprise logic for the corresponding entities discussed with regard to the display screen 1313, an on-screen input device, an on-screen input interface controller, an off-screen input device, the transmitter 1323, and the receiver 1317.

The components of computer device 1300 may communicate with one another over the bus 1306. The bus 1306 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), or some other proprietary bus used in a SoC based interface; or any number of other technologies. In some embodiments, the bus 1306 may be a controller area network (CAN) bus system, a Time-Trigger Protocol (TTP) system, or a FlexRay system, which may allow various devices (e.g., the one or more sensors 1314, etc.) to communicate with one another using messages or frames.

The communications circuitry 1305 may include circuitry for communicating with a wireless network or wired network. For example, the communication circuitry 1305 may include transceiver (Tx) 1311 and network interface controller (NIC) 1312. Communications circuitry 1305 may include one or more processors (e.g., baseband processors, modems, etc.) that are dedicated to a particular wireless communication protocol.

NIC 1312 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 1312 may be included to allow connect to a second network (not shown) or other devices, for example, a first NIC 1312 providing communications to the network 150 over Ethernet, and a second NIC 1312 providing communications to other devices over another type of network, such as a personal area network (PAN) including a personal computer (PC) device. In some embodiments, the various components of the device 1300, such as the one or more sensors 1314, etc. may be connected to the processor(s) 1302 via the NIC 1312 as discussed above rather than via the I/O circuitry 1318 as discussed infra.

The Tx 1311 may include one or more radios to wirelessly communicate with a network and/or other devices. The Tx 1311 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 1300. In some embodiments, the various components of the device 1300, such as the one or more sensors 1314, etc. may be connected to the device 1300 via the Tx 1311 as discussed above rather than via the I/O circuitry 1318 as discussed infra. In one example, the one or more sensors 1314 may be coupled with device 1300 via a short range communication protocol.

The Tx 1311 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 1318 may include circuitry, such as an external expansion bus (e.g., Universal Serial Bus (USB), FireWire, Thunderbolt, PCI/PCIe/PCIx, etc.), used to connect computer device 1300 with external components/devices, such as one or more sensors 1314, etc. I/O interface circuitry 1318 may include any suitable interface controllers and connectors to interconnect one or more of the processor circuitry 1302, memory circuitry 1304, data storage circuitry 1308, communication circuitry 1305, and the other components of computer device 1300. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 1306), ports, slots, jumpers, interconnect modules, receptacles, modular connectors, etc. The I/O circuitry 1318 may couple the device 1300 with the one or more sensors 1314, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 1314 may be any device configured to detect events or environmental changes, convert the detected events into electrical signals and/or digital data, and transmit/send the signals/data to the computer device 1300. Some of the one or more sensors 1314 may be sensors used for providing computer-generated sensory inputs. Some of the one or more sensors 1314 may be sensors used for motion and/or object detection. Examples of such one or more sensors 1314 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 1314 may include a lens-less image capture mechanism comprising an array of aperture elements, wherein light passing through the array of aperture elements define the pixels of an image. In embodiments, the motion detection one or more sensors 1314 may be coupled with or associated with light generating devices, for example, one or more infrared projectors to project a grid of infrared light onto a scene, where an infrared camera may record reflected infrared light to compute depth information.

Some of the one or more sensors 1314 may be used for position and/or orientation detection, ambient/environmental condition detection, and the like. Examples of such one or more sensors 1314 may include, inter alia, microelectromechanical systems (MEMS) with piezoelectric, piezoresistive and/or capacitive components, which may be used to determine environmental conditions or location information related to the computer device 1300. In embodiments, the MEMS may include 3-axis accelerometers, 3-axis gyroscopes, and/or magnetometers. In some embodiments, the one or more sensors 1314 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 1302, the hardware accelerator 1303, the memory 1304, the data storage circuitry 1308 including the modules 1309, the input/output interface 1318, the one or more sensors 1314, the communication circuitry 1305 including the Tx 1311, the NIC 1312, the system bus 1306, the computer bus 1339, the device 1331, the device 1335, may perform its conventional functions known in the art. In addition, they may be employed to store and host execution of programming instructions implementing various operating system functions and/or applications. The various elements may be implemented by assembler instructions supported by processor(s) 1302 or high-level languages, such as, for example, C, that can be compiled into such instructions. Operations associated with the device 1300 not implemented in software may be implemented in hardware, e.g., via hardware accelerator 1303.

The number, capability and/or capacity of these elements 1302-1339 may vary, depending on the number of other devices the device 1300 is configured to support. Otherwise, the constitutions of elements 1302-1339 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 14:
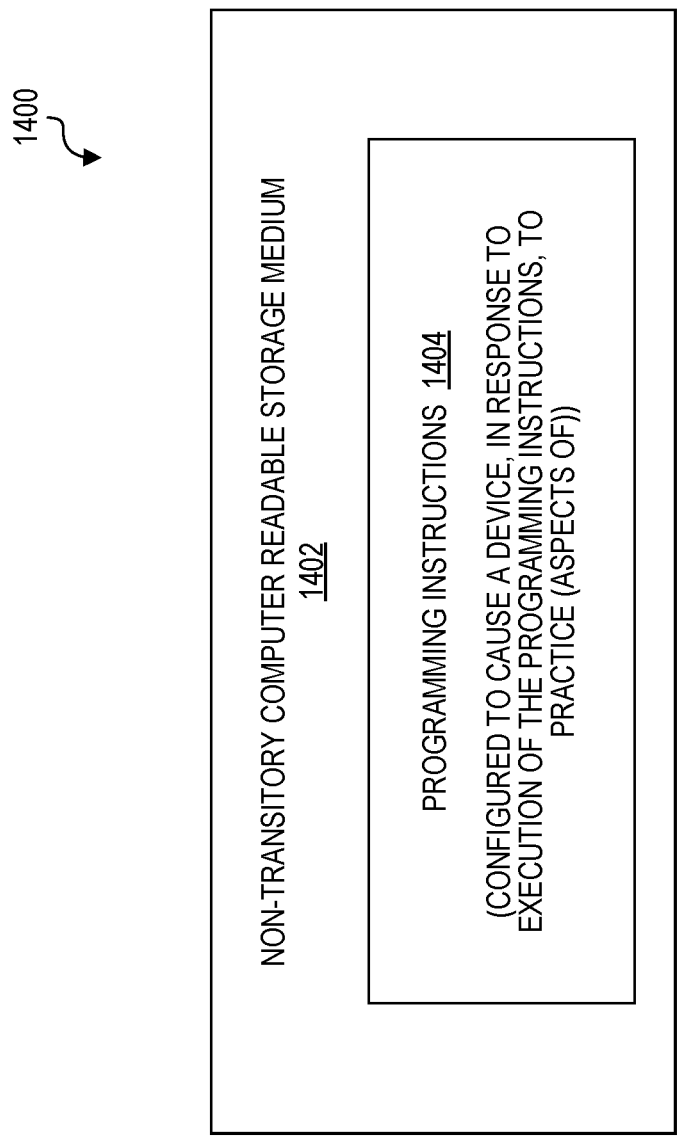
FIG. 14 illustrates an example device suitable for use to practice various aspects of the present disclosure, in accordance with various embodiments.

Furthermore, the present disclosure may take the form of a computer program product embodied in any tangible or non-transitory medium of expression having computer-usable program code embodied in the medium. FIG. 14 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1402 may include a number of programming instructions 1404. Programming instructions 1404 may be configured to enable a device, e.g., device 1300, in response to execution of the programming instructions, to perform, e.g., various programming operations associated with operating system functions and/or applications.

In alternate embodiments, programming instructions 1404 may be disposed on multiple computer-readable non-transitory storage media 1402 instead. In alternate embodiments, programming instructions 1404 may be disposed on computer-readable transitory storage media 1402, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Figure 15:
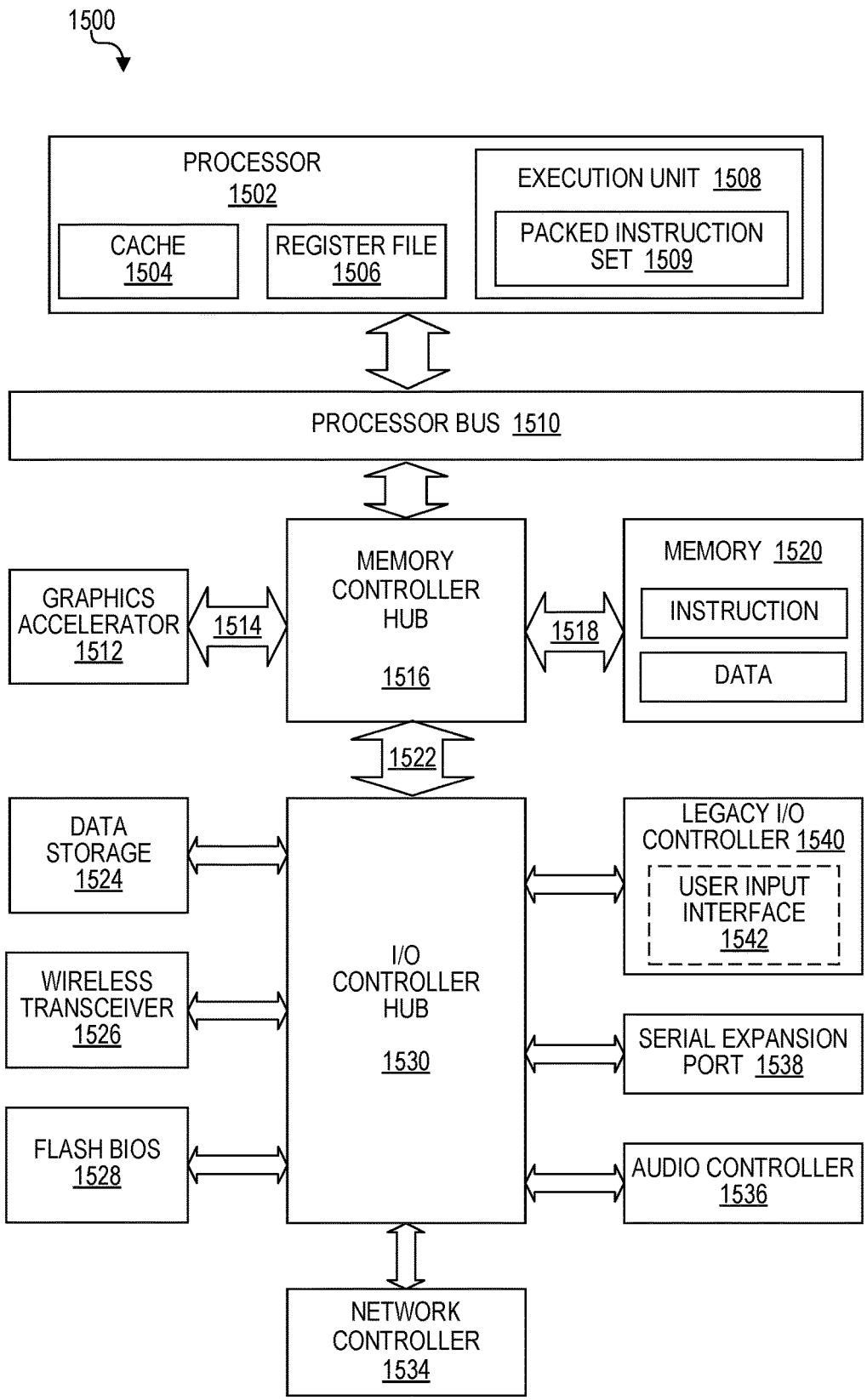
FIG. 15 illustrates a storage medium having executable instructions, in accordance with various embodiments.

Turning to FIG. 15, a block diagram of an exemplary computer system formed with a processor that includes execution units to execute an instruction, where one or more of the interconnects implement one or more features in accordance with one embodiment of the present invention is illustrated. System 1500 includes a component, such as a processor 1502 to employ execution units including logic to perform algorithms for process data, in accordance with the present invention, such as in the embodiment described herein. System 1500 is representative of processing systems based on the PENTIUM III™, PENTIUM4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1500 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1502 includes one or more execution units 1508 to implement an algorithm that is to perform at least one instruction. One embodiment may be described in the context of a single processor desktop or server system, but alternative embodiments may be included in a multiprocessor system. System 1500 is an example of a 'hub' system architecture. The computer system 1500 includes a processor 1502 to process data signals. The processor 1502, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1502 is coupled to a processor bus 1510 that transmits data signals between the processor 1502 and other components in the system 1500. The elements of system 1500 (e.g. graphics accelerator 1512, memory controller hub 1516, memory 1520, I/O controller hub 1530, wireless transceiver 1526, Flash BIOS 1528, Network controller 1534, Audio controller 1536, Serial expansion port 1538, legacy I/O controller 1540 with a user input interface 1542, etc.) perform their conventional functions that are well known to those familiar with the art.

In one embodiment, the processor 1502 includes a Level 1 (L1) internal cache memory 1504. Depending on the architecture, the processor 1502 may have a single internal cache or multiple levels of internal caches. Other embodiments include a combination of both internal and external caches depending on the particular implementation and needs. Register file 1506 is to store different types of data in various registers including integer registers, floating point registers, vector registers, banked registers, shadow registers, checkpoint registers, status registers, and instruction pointer register.

Execution unit 1508, including logic to perform integer and floating point operations, also resides in the processor 1502. The processor 1502, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1502. For one embodiment, execution unit 1508 includes logic to handle a packed instruction set 1509. By including the packed instruction set 1509 in the instruction set of a general-purpose processor 1502, along with associated circuitry to execute the instructions, the operations used by many multimedia applications may be performed using packed data in a general-purpose processor 1502. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1508 may also be used in micro controllers, embedded processors, graphics devices, DSPs, and other types of logic circuits. System 1500 includes a memory 1520. Memory 1520 includes a dynamic random access memory (DRAM) device, a static random access memory (SRAM) device, flash memory device, or other memory device. Memory 1520 stores instructions and/or data represented by data signals that are to be executed by the processor 1502.

Note that any of the aforementioned features or aspects of the invention may be utilized on one or more interconnect illustrated in FIG. 15. For example, an on-die interconnect (ODI), which is not shown, for coupling internal units of processor 1502 implements one or more aspects of the invention described above. Or the invention is associated with a processor bus 1510 (e.g. Intel Quick Path Interconnect (QPI) or other known high performance computing interconnect), a high bandwidth memory path 1518 to memory 1520, a point-to-point link to graphics accelerator 1512 (e.g. a Peripheral Component Interconnect express (PCIe) compliant fabric), a controller hub interconnect 1522, an I/O or other interconnect (e.g. USB, PCI, PCIe) for coupling the other illustrated components. Some examples of such components include the audio controller 1536, firmware hub (flash BIOS) 1528, wireless transceiver 1526, data storage 1524, legacy I/O controller 1510 containing user input and keyboard interfaces 1542, a serial expansion port 1538 such as Universal Serial Bus (USB), and a network controller 1534. The data storage device 1524 can comprise a hard disk drive, a floppy disk drive, a CD-ROM device, a flash memory device, or other mass storage device.

Figure 16:
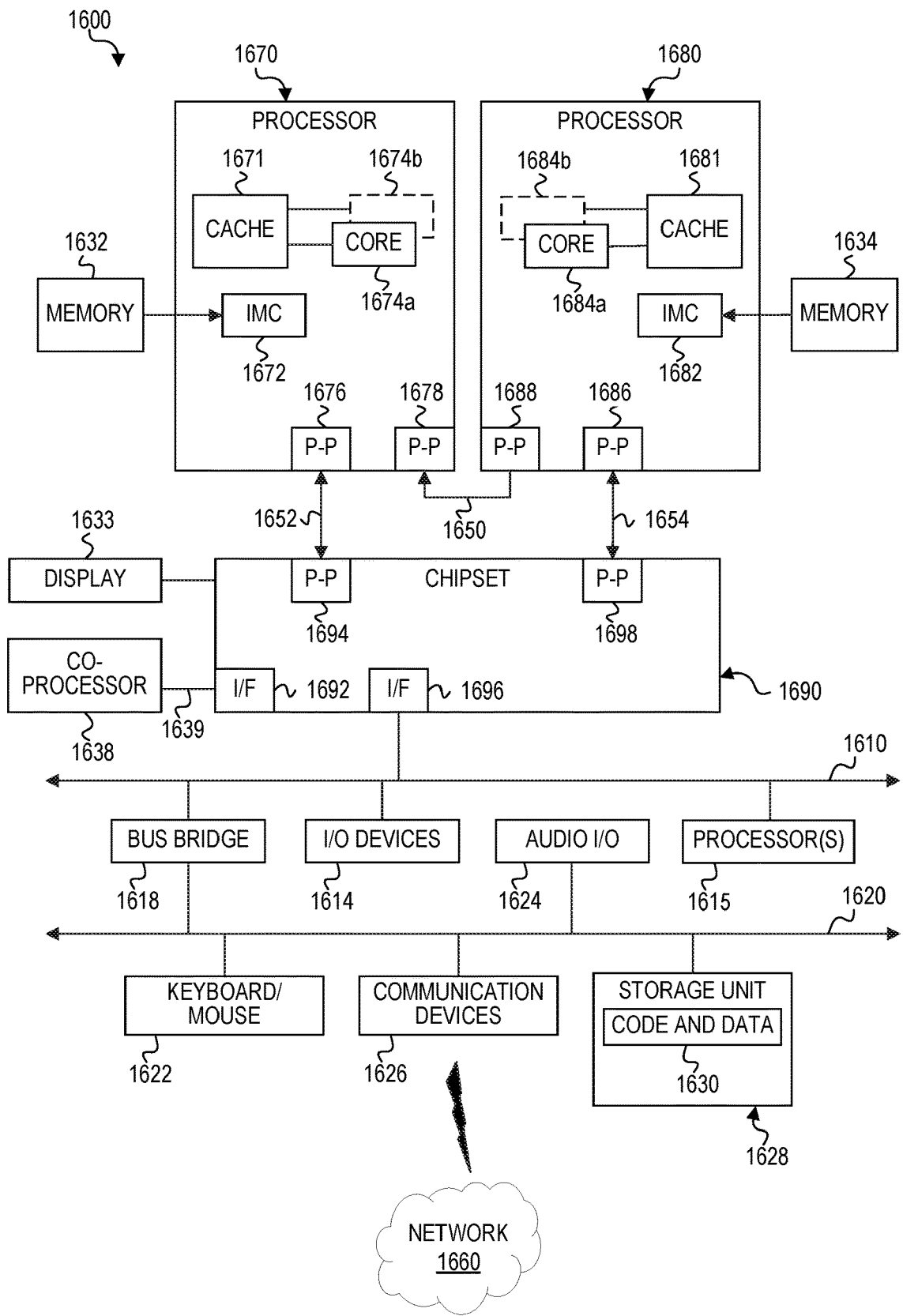
FIG. 16 is a block diagram of an example computer architecture according to at least one embodiment of the present disclosure.

FIG. 16 illustrates a computing system 1600 that is arranged in a point-to-point (PtP) configuration according to an embodiment. In particular, FIG. 16 shows a system where processors, memory, and input/output devices are interconnected by a number of point-to-point interfaces. Generally, one or more of the computing systems or computing devices described (e.g., architecture 500 for a system with link encryption providing a tag frequency change protocol for dynamically changing tag frequencies) herein may be configured in the same or similar manner as computing system 1600.

Processors 1670 and 1680 may be implemented as single core processors 1674*a* and 1684*a* or multi-core processors 1674*a*-1674*b* and 1684*a*-1684*b*. Processors 1670 and 1680 may each include a cache 1671 and 1681 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 1670 and 1680 may also each include integrated memory controller logic (MC) 1672 and 1682 to communicate with memory elements 1632 and 1634, which may be portions of main memory locally attached to the respective processors. In alternative embodiments, memory controller logic 1672 and 1682 may be discrete logic separate from processors 1670 and 1680. Memory elements 1632 and/or 1634 may store various data to be used by processors 1670 and 1680 in achieving operations and functionality outlined herein.

Processors 1670 and 1680 may be any type of processor, such as those discussed in connection with other figures. Processors 1670 and 1680 may exchange data via a point-to-point (PtP) interface 1650 using point-to-point interface circuits 1678 and 1688, respectively. Processors 1670 and 1680 may each exchange data with an input/output (I/O) subsystem 1690 via individual point-to-point interfaces 1652 and 1654 using point-to-point interface circuits 1676, 1686, 1694, and 1698. I/O subsystem 1690 may also exchange data with a high-performance graphics circuit 1638 via a high-performance graphics interface 1639, using an interface circuit 1692, which could be a PtP interface circuit. In one embodiment, the high-performance graphics circuit 1638 is a special-purpose processor, such as, for example, a high-throughput MIC processor, a network or communication processor, compression engine, graphics processor, GPGPU, embedded processor, or the like. I/O subsystem 1690 may also communicate with a display 1633 for displaying data that is viewable by a human user. In alternative embodiments, any or all of the PtP links illustrated in FIG. 16 could be implemented as a multi-drop bus rather than a PtP link.

I/O subsystem 1690 may be in communication with a bus 1620 via an interface circuit 1696. Bus 1620 may have one or more devices that communicate over it, such as a bus bridge 1618 and I/O devices 1616. Via a bus 1610, bus bridge 1618 may be in communication with other devices such as a user interface 1612 (such as a keyboard, mouse, touchscreen, or other input devices), communication devices 1626 (such as modems, network interface devices, or other types of communication devices that may communicate through a computer network 1660), audio I/O devices 1614, and/or a data storage device 1628. Data storage device 1628 may store code and data 1630, which may be executed by processors 1670 and/or 1680. In alternative embodiments, any portions of the bus architectures could be implemented with one or more PtP links.

The computer system depicted in FIG. 16 is a schematic illustration of an embodiment of a computing system that may be utilized to implement various embodiments discussed herein. It will be appreciated that various components of the system depicted in FIG. 16 may be combined in a system-on-a-chip (SoC) architecture or in any other suitable configuration capable of achieving the functionality and features of examples and implementations provided herein.

Computer program code for carrying out some of the operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiments are chosen and described in order to best explain the principles of the disclosure and the practical application, and to enable others of ordinary skill in the art to understand the disclosure for embodiments with various modifications as are suited to the particular use contemplated.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

OTHER NOTES AND EXAMPLES

The following examples pertain to embodiments in accordance with this specification. The system, apparatus, method, and machine readable storage medium embodiments can include one or a combination of the following examples:

Example S1 is a system comprising: a processor; a first hardware endpoint including a first configurable cryptographic engine (CCE); and a second hardware endpoint including a second configurable cryptographic engine (CCE), where the second hardware endpoint is connected to the first hardware endpoint via a data link between the second CCE and the first CCE, and where the second CCE is to: receive a first request to change a first tag frequency; initiate a tag frequency change protocol to change the first tag frequency to a second tag frequency; and subsequent to initiating the tag frequency change protocol, generate a first authentication tag for one or more transactions in a first transaction window defined by the first tag frequency, where the first transaction window is to include a different number of transactions than a second transaction window defined by the second tag frequency.

In Example S2, the subject matter of Example S1 can optionally include a machine-readable storage medium with instructions stored thereon, where the instructions are executable to cause the processor to send, to the second hardware endpoint, the first request to change the first tag frequency.

In Example S3, the subject matter of Example S2 can optionally include where the first request to change the first tag frequency is received from an operating system or a virtual machine manager (VMM).

In Example S4, the subject matter of any one of Examples S1-S3 can optionally include where the data link is compliant with a Peripheral Component Interconnect Express (PCIe)-based protocol or a high speed link-based protocol.

In Example S5, the subject matter of any one of Examples S1-S4 can optionally include where, to perform the tag frequency change protocol, the second CCE is to: generate a tag message for the one or more transactions of the first transaction window, where the tag message is to be sent over the data link and includes the first authentication tag and an indication that the first authentication tag is a last authentication tag to be generated based on the first tag frequency.

In Example S6, the subject matter of Example S5 can optionally include where, to perform the tag frequency change protocol, the second CCE is further to: generate a first message to send to the first CCE indicating the first tag frequency is to change; and receive a second message from the first CCE acknowledging receipt of the first message, where the tag message is to be sent to the first CCE based, at least in part, on receiving the second message.

In Example S7, the subject matter of Example S6 can optionally include where the first message specifies the first tag frequency and the second tag frequency.

In Example S8, the subject matter of any one of Examples S1-S7, can optionally include where the first CCE is to: initiate the tag frequency change protocol to change the first tag frequency to the second tag frequency for transactions that are sent from the first CCE to the second CCE; and subsequent to the first CCE initiating the tag frequency change protocol, generate a third authentication tag for one or more transactions sent over the data link to the first CCE in a third transaction window defined by the first tag frequency.

In Example S9, the subject matter of Example S8 can optionally include where the first CCE is to initiate the tag frequency change protocol in response to the second CCE changing the first tag frequency to the second tag frequency for transactions that are sent from the second CCE to the first CCE, or in response to receiving a second request to change the first tag frequency to the second tag frequency for transactions that are sent from the first CCE to the second CCE.

In Example S10, the subject matter of any one of Examples S1-S9 can optionally include where the first hardware endpoint is one of an accelerator, a Peripheral Component Interconnect Express switch, a root port, a high speed accelerator, or a high speed interface.

In Example S11, the subject matter of any one of Examples S1-S10 can optionally include where the second hardware endpoint is one of an accelerator, a Peripheral Component Interconnect Express switch, a root port, a high speed accelerator, or a high speed interface.

In Example S12, the subject matter of any one of Examples S1-S11 can optionally include where the second CCE is to: receive a third request to change the second tag frequency; and based on determining that the third request was not sent by a trusted entity of the system, block the third request.

Example M1 is a method comprising: receiving, at a first endpoint, a first request to change a current tag frequency used to generate a first authentication tag for one or more transactions of a first transaction window sent over a data link to a second endpoint coupled to a processor core; sending a message to the second endpoint that the current tag frequency is to change to a new tag frequency, where a second authentication tag for one or more transactions in a second transaction window is to be generated based on the new tag frequency; and changing the current tag frequency to the new tag frequency based, at least in part, on receiving an acknowledgement that the second endpoint received the message that the current tag frequency is to change to the new tag frequency.

In Example M2, the subject matter of M1 can optionally include: subsequent to receiving the request to change the current tag frequency, identifying an open transaction window with one or more outstanding transactions; sending the one or more outstanding transactions over the data link to the second endpoint; generating a third authentication tag for one or more transactions of the open transaction window; and generating a tag message including the third authentication tag and an indication that the third authentication tag is a last authentication tag that is to be generated based on the current tag frequency.

In Example M3, the subject matter of Example M2 can optionally include sending at least one transaction of the open transaction window to the second endpoint after receiving the acknowledgement and before sending the tag message to the second endpoint.

In Example M4, the subject matter of Example M3 can optionally include where the at least one transaction of the open transaction window is a dummy transaction.

In Example M5, the subject matter of any one of Examples M1-M4 can optionally include where the request to change the current tag frequency is received from an operating system or a virtual machine manager (VMM).

In Example M6, the subject matter of any one of Examples M1-M5 can optionally include where the data link is compliant with a Peripheral Component Interconnect Express (PCIe)-based protocol or a high speed link-based protocol.

In Example M7, the subject matter of any one of Examples M1-M6 can optionally include where the first message specifies the first tag frequency and the second tag frequency.

In Example M8, the subject matter of any one of Examples M1-M7 can optionally include where the first endpoint is one of an accelerator, a Peripheral Component Interconnect Express switch, a root port, a high speed accelerator, or a high speed interface.

In Example M9, the subject matter of any one of Examples M1-M8 can optionally include where the second endpoint is one of an accelerator, a Peripheral Component Interconnect Express switch, a root port, a high speed accelerator, or a high speed interface.

In Example M10, the subject matter of any one of Examples M1-M9 can optionally include receiving a second request to change the second tag frequency; and based on determining that the second request was not sent by a trusted entity, blocking the third request.

In Example M11, the subject matter of any one of Examples M1-M10 can optionally include where the first tag frequency indicates a first number of transactions, where the second tag frequency indicates a second number of transactions, and where the first number is different than the second number.

Example A1 is an apparatus comprising: a first configurable cryptographic engine, the first configurable cryptographic engine including: a link counter to store a first value to be incremented based on a first tag frequency; a block counter to store a second value to be incremented for each block of data to be encrypted and sent over a data link to a second configurable cryptographic engine during a first transaction window defined by the first tag frequency; authentication circuitry coupled to the link counter and the block counter to generate a first authentication tag for one or more transactions in the first transaction window; and communication circuitry to dynamically change the first tag frequency to a second tag frequency and to generate a second authentication tag for one or more transactions in a second transaction window defined by the second tag frequency.

In Example A2, the subject matter of Example A1 can optionally include where in response to receiving a request from a software component to change the first tag frequency to the second tag frequency, the communication circuitry is further to initiate a tag frequency change protocol to dynamically change the first tag frequency to the second tag frequency.

In Example A3, the subject matter of any one of Examples A1-A2 can optionally include where the first authentication tag is to be generated based, in part, on encrypted blocks of data in the one or more transactions to be sent over the data link during the first transaction window.

In Example A4, the subject matter of any one of Examples A1-A3 can optionally include where the communication circuitry is to further: subsequent to receiving a request to change the first tag frequency, identify an open transaction window with one or more outstanding transactions; send the one or more outstanding transactions over the data link to the second configurable cryptographic engine; generate a third authentication tag for one or more transactions of the open transaction window; and generate a tag message including the third authentication tag and an indication that the third authentication tag is a last authentication tag that is to be generated based on the first tag frequency.

In Example A5, the subject matter of any one of Examples A1-A4 can optionally include where the first tag frequency indicates a first number of transactions, where the second tag frequency indicates a second number of transactions, where the first number is different than the second number.

An Example X1 provides an apparatus, the apparatus comprising means for performing the method of any one of the preceding Examples M1-M11.

In Example X2, the subject matter of Example X1 can optionally include that the means for performing the method comprises at least one processor and at least one memory element.

In Example X3, the subject matter of Example X2 can optionally include that the at least one memory element comprises machine readable instructions that when executed, cause the apparatus to perform the method of any one of the Examples M1-M11.

In Example X4, the subject matter of any one of Examples X1-X3 can optionally include that the apparatus is one of a computing system or a system-on-a-chip.

Example Y1 provides at least one machine readable storage medium comprising instructions, where the instructions when executed realize a system or an apparatus or implement a method in any one of the Examples S1-S12, M1-M11, or A1-A5.

The invention claimed is:

1. A system, comprising:
   a processor;
   a first hardware endpoint including a first configurable cryptographic engine (CCE); and
   a second hardware endpoint including a second configurable cryptographic engine (CCE), the second hardware endpoint connected to the first hardware endpoint via a data link between the second CCE and the first CCE, wherein the second CCE is to:
   receive a first request to change a first tag frequency for transactions that are sent from the second CCE to the first CCE;
   initiate a tag frequency change protocol to change the first tag frequency to a second tag frequency; and
   subsequent to initiating the tag frequency change protocol, generate a first authentication tag for one or more transactions in a first transaction window defined by the first tag frequency, wherein the first transaction window is to include a different number of transactions than a second transaction window defined by the second tag frequency.

2. The system of claim 1, further comprising:
   a machine-readable storage medium with instructions stored thereon, wherein the instructions are executable to cause the processor to send, to the second hardware endpoint, the first request to change the first tag frequency.

3. The system of claim 2, wherein the first request to change the first tag frequency is received from an operating system or a virtual machine manager (VMM).

4. The system of claim 1, wherein the data link is compliant with a Peripheral Component Interconnect Express (PCIe)-based protocol or a high speed link-based protocol.

5. The system of claim 1, wherein, to perform the tag frequency change protocol, the second CCE is to:
   generate a tag message for the one or more transactions in the first transaction window, wherein the tag message is to be sent over the data link and includes the first authentication tag and an indication that the first authentication tag is a last authentication tag to be generated based on the first tag frequency.

6. The system of claim 5, wherein, to perform the tag frequency change protocol, the second CCE is further to:
   generate a first message to send to the first CCE indicating the first tag frequency is to change; and
   receive a second message from the first CCE acknowledging receipt of the first message, wherein the tag message is to be sent to the first CCE based, at least in part, on receiving the second message.

7. The system of claim 6, wherein the first message specifies the first tag frequency and the second tag frequency.

8. The system of claim 6, wherein the first CCE is to:
   initiate the tag frequency change protocol to change the first tag frequency to the second tag frequency for transactions that are sent from the first CCE to the second CCE; and
   subsequent to the first CCE initiating the tag frequency change protocol, generate a third authentication tag for one or more transactions sent over the data link to the second CCE in a third transaction window defined by the first tag frequency.

9. The system of claim 1, wherein the first CCE is to initiate the tag frequency change protocol in response to the second CCE changing the first tag frequency to the second tag frequency for transactions that are sent from the second CCE to the first CCE, or in response to receiving a second request to change the first tag frequency to the second tag frequency for transactions that are sent from the first CCE to the second CCE.

10. The system of claim 1, wherein the first hardware endpoint is one of an accelerator, a Peripheral Component Interconnect Express switch, a root port, a high speed accelerator, or a high speed interface.

11. The system of claim 1, wherein the second hardware endpoint is one of an accelerator, a Peripheral Component Interconnect Express switch, a root port, a high speed accelerator, or a high speed interface.

12. The system of claim 1, wherein the second CCE is to:
    receive a third request to change the second tag frequency; and
    based on determining that the third request was not sent by a trusted entity of the system, block the third request.

13. A method comprising:
    receiving, at a first endpoint, a request to change a current tag frequency used to generate a first authentication tag for one or more transactions of a first transaction window sent over a data link to a second endpoint coupled to a processor core;
    sending a message to the second endpoint that the current tag frequency is to change to a new tag frequency, wherein a second authentication tag for one or more transactions of a second transaction window is to be generated based on the new tag frequency; and
    changing the current tag frequency to the new tag frequency based, at least in part, on receiving an acknowledgement that the second endpoint received the message that the current tag frequency is to change to the new tag frequency.

14. The method of claim 13, further comprising:
    subsequent to receiving the request to change the current tag frequency, identifying an open transaction window with one or more outstanding transactions;
    sending the one or more outstanding transactions over the data link to the second endpoint;
    generating a third authentication tag for one or more transactions of the open transaction window; and
    generating a tag message including the third authentication tag and an indication that the third authentication tag is a last authentication tag that is to be generated based on the current tag frequency.

15. The method of claim 14, further comprising:
sending at least one transaction of the open transaction window to the second endpoint after receiving the acknowledgement and before sending the tag message to the second endpoint.

16. The method of claim 15, wherein the at least one transaction of the open transaction window is a dummy transaction.

17. An apparatus, the apparatus comprising:
a first configurable cryptographic engine, the first configurable cryptographic engine comprising:
  a link counter to store a first value to be incremented based on a first tag frequency;
  a block counter to store a second value to be incremented for each block of data to be encrypted and sent over a data link to a second configurable cryptographic engine during a first transaction window defined by the first tag frequency;
  authentication circuitry coupled to the link counter and the block counter to generate a first authentication tag for one or more transactions in the first transaction window; and
communication circuitry to:
  dynamically change the first tag frequency to a second tag frequency; and
  generate a second authentication tag for one or more transactions in a second transaction window defined by the second tag frequency.

18. The apparatus of claim 17, wherein, in response to receiving a request from a software component to change the first tag frequency to the second tag frequency, the communication circuitry is further to initiate a tag frequency change protocol to dynamically change the first tag frequency to the second tag frequency.

19. The apparatus of claim 17, wherein the first authentication tag is to be generated based, in part, on encrypted blocks of data in the one or more transactions to be sent over the data link during the first transaction window.

20. The apparatus of claim 17, wherein the communication circuitry is to further:
  subsequent to receiving a request to change the first tag frequency, identify an open transaction window with one or more outstanding transactions;
  send the one or more outstanding transactions over the data link to the second configurable cryptographic engine;
  generate a third authentication tag for one or more transactions of the open transaction window; and
  generate a tag message including the third authentication tag and an indication that the third authentication tag is a last authentication tag that is to be generated based on the first tag frequency.

* * * * *